(12) United States Patent
Joo et al.

(10) Patent No.: US 11,822,850 B2
(45) Date of Patent: Nov. 21, 2023

(54) TILING DISPLAY APPARATUS

(71) Applicant: LG Display Co., Ltd., Seoul (KR)

(72) Inventors: Kyu Hwan Joo, Paju-si (KR); Tae Gung Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/977,741

(22) Filed: Oct. 31, 2022

(65) Prior Publication Data

US 2023/0236785 A1    Jul. 27, 2023

(30) Foreign Application Priority Data

Dec. 31, 2021  (KR) ........................ 10-2021-0194685
May 11, 2022  (KR) ........................ 10-2022-0058046

(51) Int. Cl.
*G06F 3/14* (2006.01)
*G09G 3/20* (2006.01)
*G09G 3/32* (2016.01)

(52) U.S. Cl.
CPC ......... *G06F 3/1446* (2013.01); *G09G 3/2096* (2013.01); *G09G 3/32* (2013.01); *G09G 2300/026* (2013.01); *G09G 2360/04* (2013.01); *G09G 2370/042* (2013.01)

(58) Field of Classification Search
CPC ...... G06F 3/1446; G09G 3/2096; G09G 3/32; G09G 2300/026; G09G 2360/04; G09G 2370/042
See application file for complete search history.

(56) References Cited

U.S. PATENT DOCUMENTS

| | | | |
|---|---|---|---|
| 2016/0306603 A1* | 10/2016 | Nadeson | G06F 3/011 |
| 2017/0098421 A1 | 4/2017 | Son | |
| 2017/0114971 A1* | 4/2017 | Cross | G09G 5/14 |
| 2020/0159483 A1* | 5/2020 | Yoshihara | G09G 5/006 |
| 2021/0041718 A1* | 2/2021 | Balogh | H01L 33/58 |
| 2022/0208057 A1 | 6/2022 | You et al. | |

FOREIGN PATENT DOCUMENTS

| | | |
|---|---|---|
| KR | 10-2000-0060672 A | 10/2000 |
| KR | 10-2008-0110083 A | 12/2008 |
| KR | 10-2014-0134536 A | 11/2014 |
| KR | 10-2017-0039335 A | 4/2017 |
| KR | 10-2022-0093541 A | 7/2022 |

* cited by examiner

*Primary Examiner* — Andrew Sasinowski
(74) *Attorney, Agent, or Firm* — Fenwick & West LLP

(57) ABSTRACT

A tiling display apparatus includes a plurality of display modules connected to one another through an interface circuit based on a serial communication scheme to divide input image data configuring one screen to display a plurality of module images and a set board checking a module identification number based on a connection order of the plurality of display modules and setting image re-matching control information and a module image coordinate value corresponding to the module image for each of the plurality of display modules, on the basis of a placement direction of a control printed circuit board (PCB) individually included in each display module.

19 Claims, 35 Drawing Sheets

| D-Pin | Placement Direction |
|---|---|
| 0 | 180° |
| 1 | 0° |

| D-Pin | Placement Direction |
|-------|---------------------|
| 00    | 180°                |
| 01    | 270°                |
| 10    | 90°                 |
| 11    | 0°                  |

FIG. 23

CASE1 : 90°, CASE2 : 270°, CASE3 : 0°, CASE4 : 180°

| PREVIOUS CPCB | CURRENT CPCB | COORDINATE CHANGE |
|---|---|---|
| CASE1 | CASE1 | ROW COORDINATES + 1 |
| CASE1 | CASE2 | CONNECTION NOT POSSIBLE |
| CASE1 | CASE3 | CONNECTION NOT POSSIBLE |
| CASE1 | CASE4 | COLUMN COORDINATES - 1 |
| CASE2 | CASE1 | CONNECTION NOT POSSIBLE |
| CASE2 | CASE2 | ROW COORDINATES - 1 |
| CASE2 | CASE3 | COLUMN COORDINATES + 1 |
| CASE2 | CASE4 | CONNECTION NOT POSSIBLE |
| CASE3 | CASE1 | COLUMN COORDINATES + 1 |
| CASE3 | CASE2 | CONNECTION NOT POSSIBLE |
| CASE3 | CASE3 | COLUMN COORDINATES + 1 |
| CASE3 | CASE4 | CONNECTION NOT POSSIBLE |
| CASE4 | CASE1 | CONNECTION NOT POSSIBLE |
| CASE4 | CASE2 | COLUMN COORDINATES - 1 |
| CASE4 | CASE3 | CONNECTION NOT POSSIBLE |
| CASE4 | CASE4 | COLUMN COORDINATES - 1 |

TILING DISPLAY APPARATUS

CROSS-REFERENCE TO RELATED APPLICATIONS

This application claims the benefit of the Republic of Korea Patent Application No. 10-2021-0194685 filed on Dec. 31, 2021, and Republic of Korea Patent Application No. 10-2022-0058046 filed on May 11, 2022, each of which are hereby incorporated by reference in its entirety.

BACKGROUND

Field of the Disclosure

The present disclosure relates to a tiling display apparatus capable of expanding.

Discussion of the Related Art

Large-sized displays may be used in various fields such as indoor and outdoor digital advertisements. In order to satisfy the demands for large-sized displays, tiling display apparatuses capable of being expanded have been proposed. In tiling display apparatuses, a single screen is configured by connecting a plurality of display modules, and a desired screen size may be implemented by adjusting the number of display modules connected to one another.

An input image is displayed on a single screen implementing by a connection of display modules. A resolution of an input image is a sum of resolutions implementable in display modules. Each display module divides and displays an input image by image quantity, corresponding to a resolution thereof, of the input image. To this end, a module image coordinate value and a module identification number based on a connection position should be previously set for each display module.

Various methods have been proposed for setting a module image coordinate value and a module identification number for each display module. However, according to methods of the related art, resources of a display apparatus increases, the convenience of a user is reduced, and there is a possibility that a connection error occurs due to a mistake of a worker.

SUMMARY

To overcome the aforementioned problem of the related art, the present disclosure may provide a tiling display apparatus which may decrease resources of the display apparatus associated with settings of a module image coordinate value and a module identification number, may increase the convenience of a user, and may be automatically controlled regardless of a connection scheme.

To achieve these objects and other advantages and in accordance with the purpose of the disclosure, as embodied and broadly described herein, a tiling display apparatus according to an embodiment of the present disclosure includes a plurality of display modules connected to one another through an interface circuit based on a serial communication scheme to divide input image data configuring one screen to display a plurality of module images and a set board checking a module identification number based on a connection order of the plurality of display modules and setting image re-matching control information and a module image coordinate value corresponding to the module image for each of the plurality of display modules, on the basis of a placement direction of a control printed circuit board (PCB) individually included in each display module.

A tiling display apparatus according to another embodiment of the present disclosure includes a plurality of display modules connected to one another through an interface circuit based on a serial communication scheme to divide input image data configuring one screen to display a plurality of module images, wherein each of the plurality of display modules includes a control printed circuit board (PCB), and a timing controller dividing the module image into a plurality of sub-images; and a set board generating a control command signal for causing the timing controllers in the plurality of display modules to sequentially generate a module identification number and setting, for each display modules, image re-matching control information and a module image coordinate value corresponding to the module image on the basis of a placement direction of the control PCB.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 21 is a diagram illustrating logic values of first and second direction recognition pins based on a placement direction of a control PCB in a display module according to the second embodiment;

FIGS. 22 and 23 are diagrams illustrating an example where module image coordinate values of display modules are set based on a placement direction of a control PCB, in a non-formal connection structure between display modules according to one embodiment;

DETAILED DESCRIPTION

Figure 1:
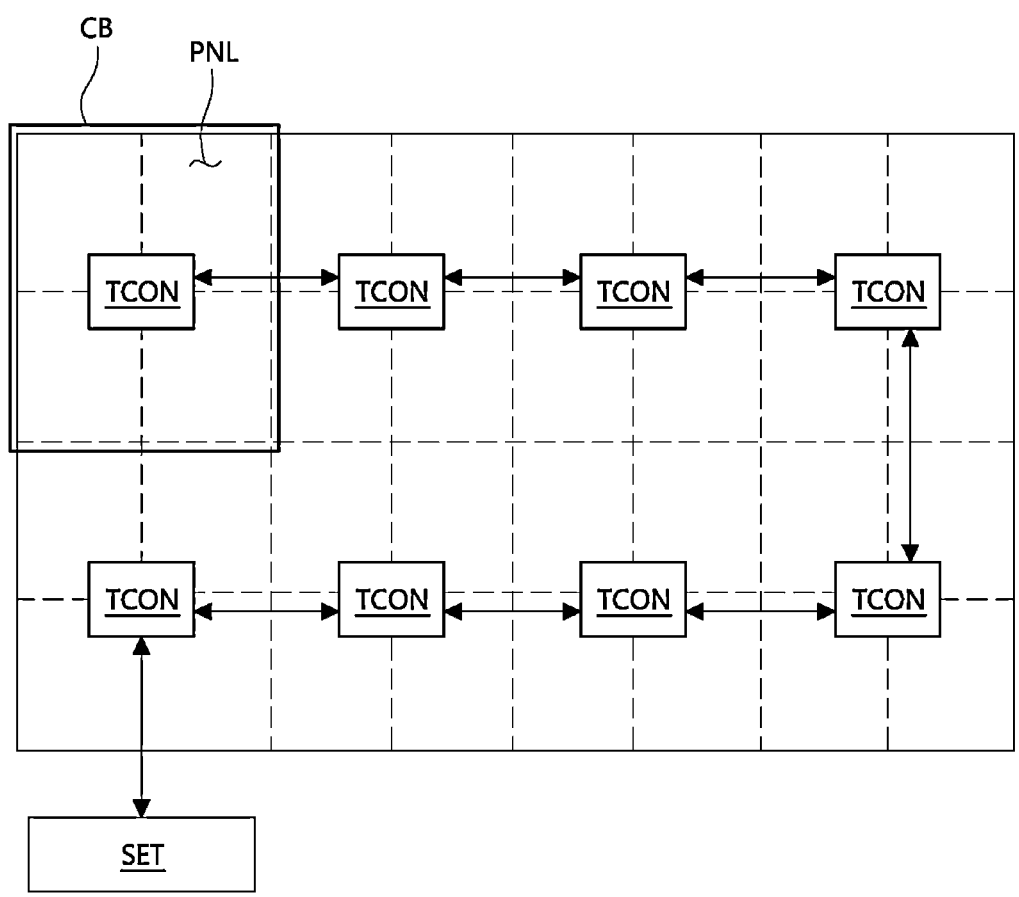
FIG. 1 is a diagram schematically illustrating a tiling display apparatus according to an embodiment of the present disclosure.

Hereinafter, the present disclosure will be described more fully with reference to the accompanying drawings, in which embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

The shapes, sizes, ratios, angles, numbers and the like disclosed in the drawings for description of various embodiments of the present disclosure to describe embodiments of the present disclosure are merely exemplary and the present disclosure is not limited thereto. Like reference numerals refer to like elements throughout. Throughout this specification, the same elements are denoted by the same reference numerals. As used herein, the terms "comprise", "having," "including" and the like suggest that other parts can be added unless the term "only" is used. As used herein, the singular forms "a", "an", and "the" are intended to include the plural forms as well, unless context clearly indicates otherwise.

Elements in various embodiments of the present disclosure are to be interpreted as including margins of error even without explicit statements.

In describing a position relationship, for example, when a position relation between two parts is described as "on-", "over-", "under-", and "next-", one or more other parts may be disposed between the two parts unless "just" or "direct" is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In the following description, when the detailed description of the relevant known function or configuration is determined to unnecessarily obscure the important point of the present disclosure, the detailed description will be omitted. Hereinafter, embodiments of the present disclosure will be described in detail with reference to the accompanying drawings.

Figure 2:
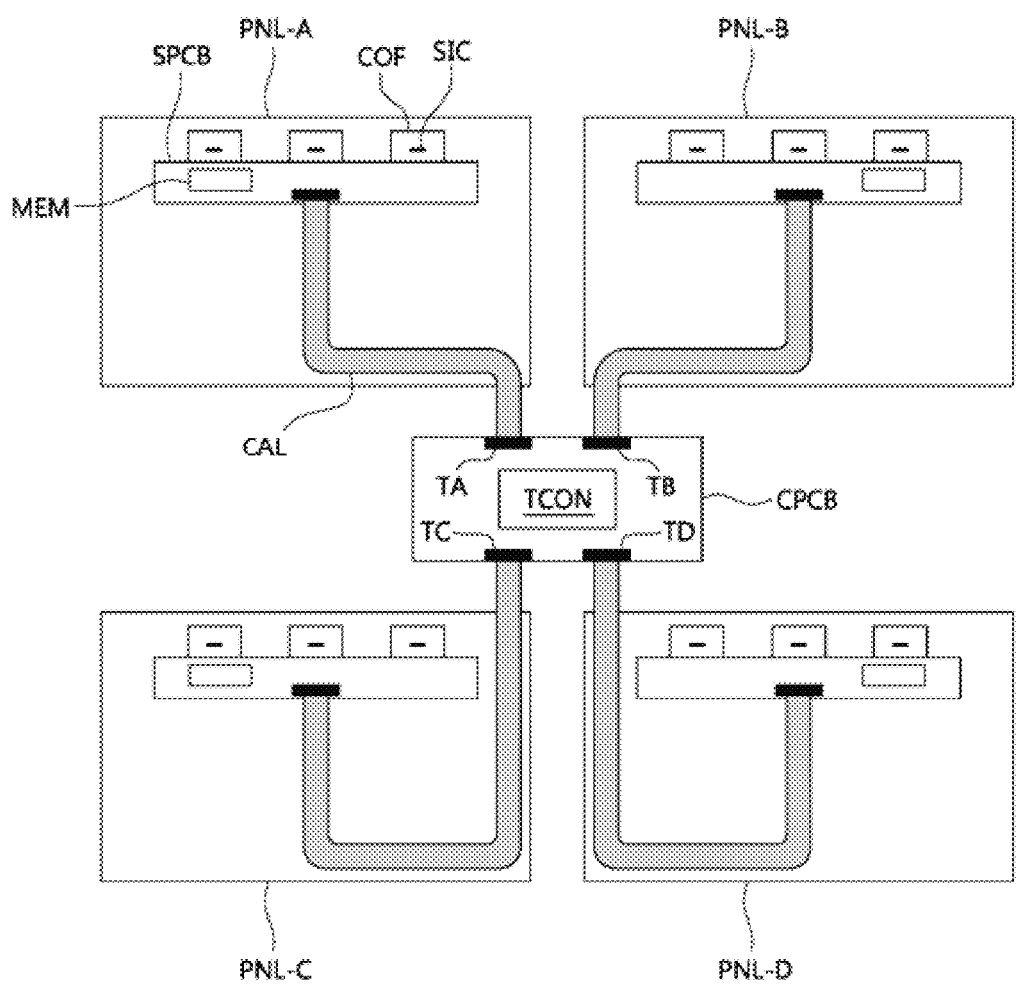
FIG. 2 is a diagram illustrating a connection configuration of a display module included in a tiling display apparatus according to an embodiment of the present disclosure.

FIG. 1 is a diagram schematically illustrating a tiling display apparatus 100 according to an embodiment of the present disclosure. FIG. 2 is a diagram illustrating a connection configuration of a display module included in the tiling display apparatus 100 according to an embodiment of the present disclosure.

Referring to FIGS. 1 and 2, the tiling display apparatus 100 according to an embodiment of the present disclosure may include a set board SET and a plurality of display modules CB. Each of the display modules CB may be referred to as a cabinet.

The display modules CB may be connected to one another through a serial interface circuit to configure a large screen. A total resolution of the large screen may be determined as a total sum of unit resolutions of each display module CB. For example, in a case where a screen is configured by eight display modules CB having a unit resolution of 960*1080, a total resolution of the screen may be 3840*2160. In this case, 3840*2160 may be a resolution of input image data, and 960*1080 may be a resolution of module image data implemented in one display module CB.

Each display module CB may be implemented as an electroluminescent display type or a liquid crystal display type, and in the following embodiment, a display module CB is implemented as a micro light emitting diode (LED)- based electroluminescent display type. However, the inventive concept is not limited to an implementation type of a display module CB.

The display modules CB may execute a target operation (for example, generating of a module identification number, sub-image re-matching, etc.) corresponding to a control command signal input from the set board SET, and in order to feed back a result of the execution to the set board SET, the display modules CB may be connected to one another through a first interface circuit based on a bidirectional serial communication scheme. The first interface circuit may be implemented as a bidirectional multi-chain interface of a feedback loop type between adjacent display modules CB.

Moreover, the set board SET may transfer image data, which is for implementing an input image, to the display modules CB through a second interface circuit. The second interface circuit may be an interface circuit based on a serial communication scheme and may be implemented based on a V-by-One (Vx1) scheme capable of high-speed and large-capacity interfacing.

The set board SET may check a module identification number based on a connection order of the display modules CB and may set image re-matching control information and a module image coordinate value corresponding to a module image, on the basis of a placement direction of a control PCB CPCB individually included in each display module CB and an input/output direction of a module image corresponding to the control PCB CPCB. Therefore, each display module CB may separate module image data from input image data on the basis of the image re-matching control information and the module image coordinate value, divide the module image data into sub-image data, and re-match the data.

Each display module CB may include a plurality of display panels PNL-A, PNL-B, PNL-C, and PNL-D which divide a module image into sub-images to display the sub-images, a plurality of panel driving circuits for driving the display panels PNL-A, PNL-B, PNL-C, and PNL-D, a timing controller TCON which controls the panel driving circuits, and the control PCB CPCB for mounting the timing controller TCON. The control PCB CPCB may include a plurality of image output ports TA, TB, TC, and TD for electrically connecting the timing controller TCON to the display panels PNL-A, PNL-B, PNL-C, and PNL-D. The image output ports TA, TB, TC, and TD may be connected to panel driving circuits of a corresponding display module CB in parallel through a branch cable CAL.

The timing controller TCON may be connected to an adjacent display module CB or set board SET through first and second interface circuits. The timing controller TCON may re-match image data of sub-images with the image output ports TA, TB, TC, and TD on the basis of the image re-matching control information and the module image coordinate value which are set in the set board SET. Therefore, an image distortion phenomenon, such as image mixing and image inversion occurring when a placement direction of the control PCB CPCB differs from a predetermined default direction, may be prevented. The default direction may be the same as or different from a specific direction (for example, a forward direction). However, the default direction and the specific direction may be determined based on a design spec.

The panel driving circuits may be individually connected to the plurality of display panels PNL-A, PNL-B, PNL-C, and PNL-D. The panel driving circuits may include a source PCB SPCB connected to the timing controller TCON through the branch cable CAL, a memory circuit MEM mounted on the source PCB SPCB, a conductive film COF electrically connecting the source PCB SPCB to the display panel PNL, a data driver SIC bonded on the conductive film COF, and a gate driver and a power circuit electrically connected to the source PCB SPCB.

The memory circuit MEM may be a non-volatile memory which stores a panel characteristic and may include a correction value for gamma setting, a first compensation value for compensating for a driving characteristic deviation/color deviation between pixels, a second compensation value for compensating for a boundary deviation between adjacent display panels PNL-A, PNL-B, PNL-C, and PNL-D, various image qualities, and driving control data. The memory circuit MEM may be flash memory and/or electrically erasable programmable read-only memory (EEPROM). A high amount of data may be stored in flash memory, and a low amount of data may be stored in EEPROM.

Figure 3:
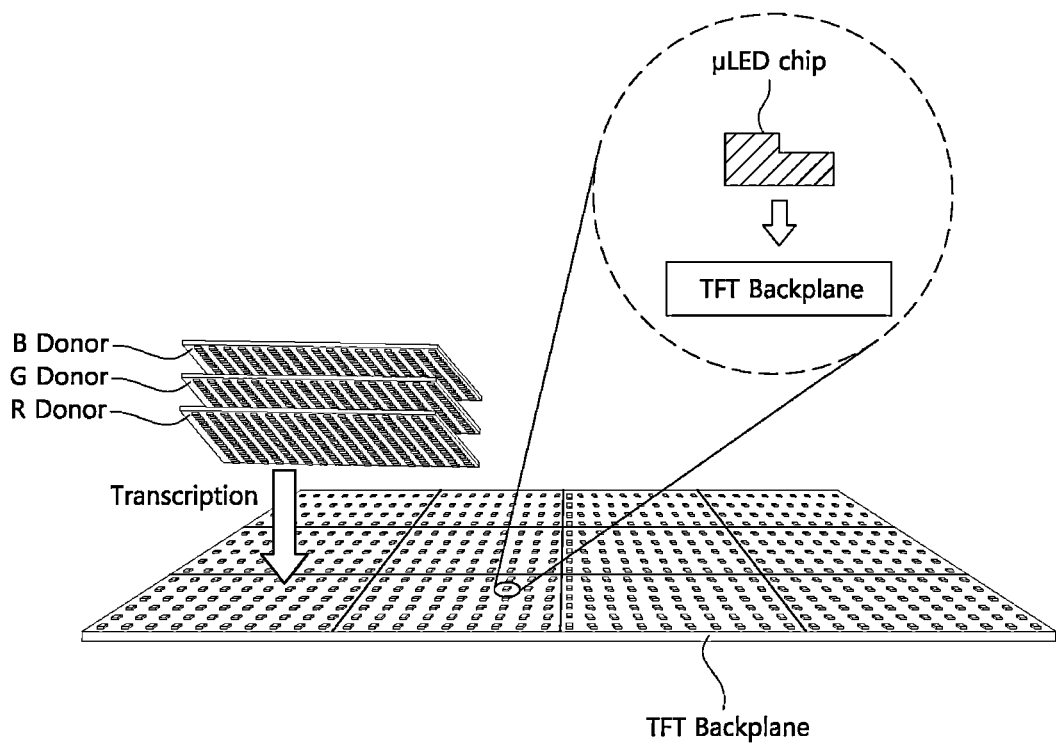
FIGS. 3 and 4 are diagrams illustrating a display panel based on a micro light emitting diode (LED) according to an embodiment of the present disclosure.
Figure 4:
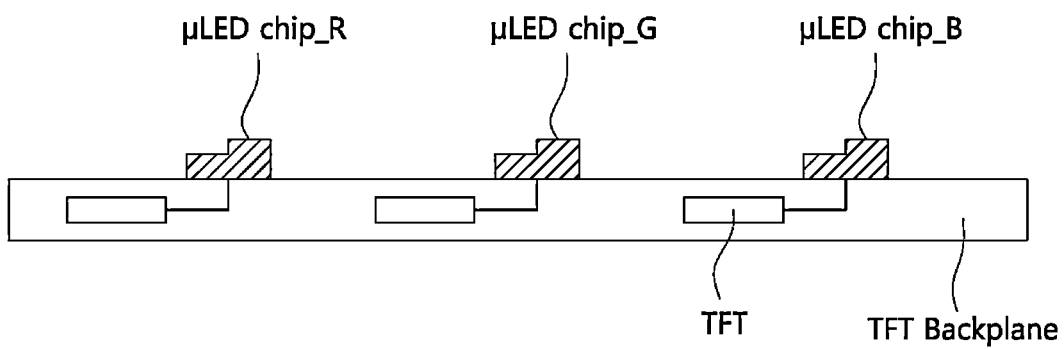

Referring to FIGS. 3 and 4, a pixel array for reproducing an input image may be provided in each of the display panels PNL. A plurality of pixels may be arranged in the pixel array, and signal lines for driving the pixels may be arranged in the pixel array. The signal lines may include a plurality of data lines DL for supplying data voltages Vdata to the pixels, a plurality of gate lines GL for supplying a gate signal GSIG to the pixels, and a plurality of power lines for supplying a source voltage to the pixels.

Each of the pixels may include a micro-LED chip (μLED chip) as a light emitting device EL. A plurality of micro-LED chips (μLED chip) may include red chips (μLED chip_R), green chips (μLED chip_G), and blue chips (μLED chip_B), which are disposed on a thin film transistor (TFT) backplane. A red (R) pixel may include a red chip (μLED chip_R) as a light emitting device EL, a green (G) pixel may include a green chip (μLED chip_G) as a light emitting device EL, and a blue (B) pixel may include a blue chip (μLED chip_B) as a light emitting device EL.

The micro-LED chips (μLED chip) may be transferred from R/G/B donors, and thus, may be mounted on a TFT backplane. The red chips (μLED chip_R) may be transferred from an R donor, the green chips (μLED chip_G) may be transferred from a G donor, and the blue chips (μLED chip_B) may be transferred from a B donor. Transfer technology may use an electrostatic force, a laser, a speed-dependent tacky force, and a load-dependent tacky force. The transfer technology is not limited thereto and may use self-assembly based on an electrostatic force.

The TFT backplane may be implemented in an active matrix structure for efficient driving. In the TFT backplane, the pixels may be defined by the data lines DL, the gate lines GL, and the power lines.

A plurality of pixels may configure one unit pixel. For example, R, G, and B pixels arranged adjacent thereto may configure one unit pixel in an extension direction of the gate line GL or an extension direction of the data line DL.

Figure 5:
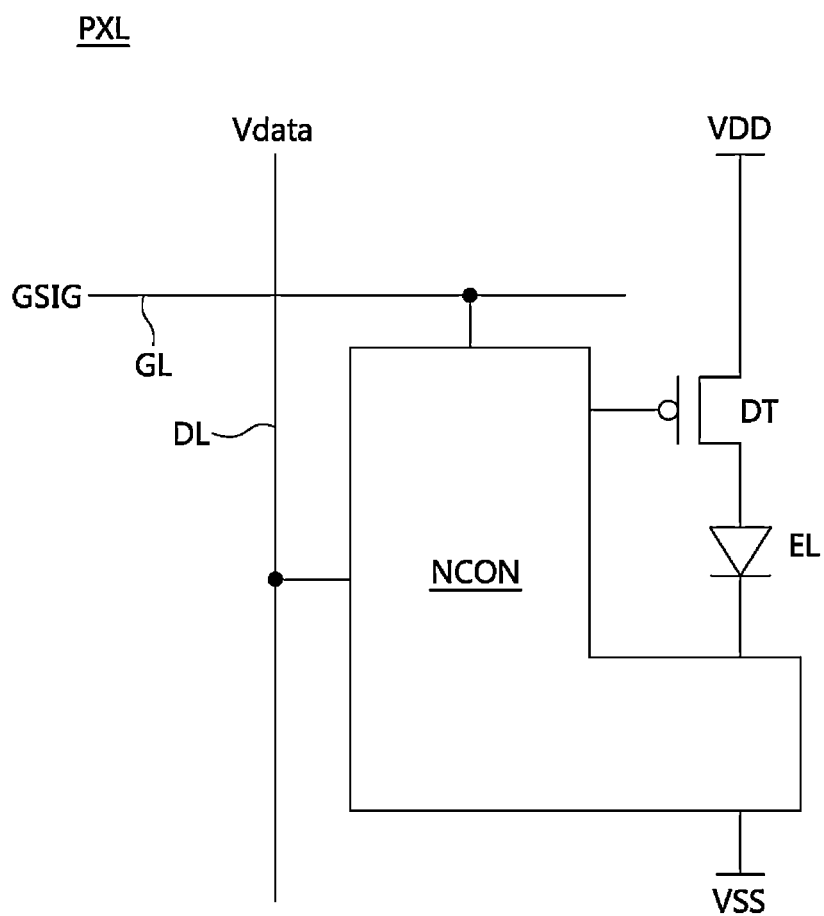
FIG. 5 is a schematic equivalent circuit diagram of a pixel included in a display panel according to an embodiment of the present disclosure.

As in FIG. 5, a pixel PXL may include a light emitting device EL, a driving TFT DT, and a node circuit NCON.

The node circuit NCON may be connected to the gate line GL and the data line DL. The node circuit NCON may be supplied with the data voltage Vdata through the data line DL and may be supplied with the gate signal GSIG through the gate line GL. The node circuit NCON may apply the data voltage Vdata to a gate electrode of the driving TFT DT in synchronization with the gate signal GSIG, and thus, may set a gate-source voltage of the driving TFT DT on the basis of a condition for generating a driving current. The node circuit NCON may include an internal compensation circuit which senses and compensates for a threshold voltage and/or electron mobility of the driving TFT DT.

The driving TFT DT may be a driving element which generates the driving current on the basis of the gate-source voltage thereof. The gate electrode of the driving TFT DT may be connected to the node circuit NCON, a first electrode (a drain electrode) thereof may be connected to a high level pixel power VDD, and a second electrode (a source electrode) thereof may be connected to a light emitting device EL.

The light emitting device EL may be a light emitting device which emits light having strength corresponding to the driving current input to the driving TFT DT. The light emitting device EL may be implemented with a micro-LED including an inorganic light emitting layer. A first electrode of the light emitting device EL may be connected to the driving TFT DT, and a second electrode thereof may be connected to a low level pixel power VSS.

A connection configuration and an operation of one pixel PXL may be merely an embodiment, and the spirit of the present disclosure is not limited thereto. For example, each of the driving TFT DT and the node circuit NCON may be implemented based on a PMOS transistor, or may be implemented based on an NMOS transistor. Also, the gate line GL connected to the node circuit NCON may be provided in plurality.

Figure 6:
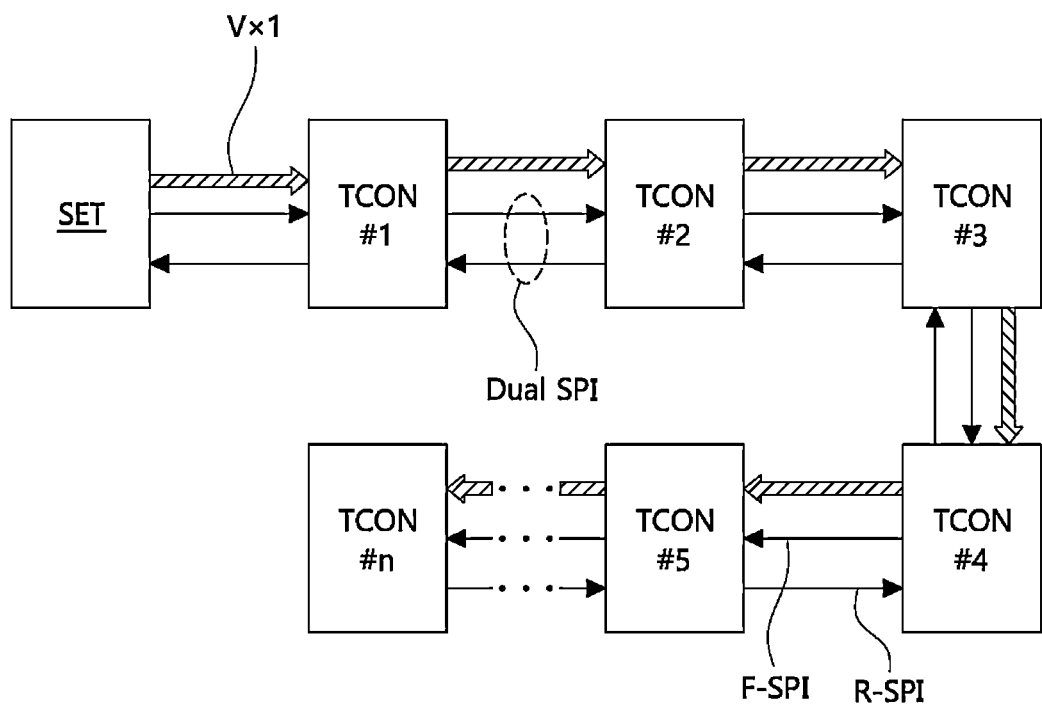
FIG. 6 is a diagram illustrating an interfacing structure of a tiling display apparatus according to an embodiment of the present disclosure.

FIG. 6 is a diagram illustrating an interfacing structure of a tiling display apparatus according to one embodiment.

Referring to FIG. 6, a first interface circuit which connects a set board SET to first to $n^{th}$ timing controllers TCON #1 to TCON #n of display modules may be implemented as a bidirectional dual serial peripheral interface (SPI). Individual bidirectional serial communication between display modules CB may be performed by the first interface circuit, and thus, a short communication line may be secured and the speed and reliability of large-capacity data communication based on a short communication line may be enhanced.

In order to implement a bidirectional dual SPI, each of the first to $n^{th}$ timing controllers TCON #1 to TCON #n may include a first master port, a first slave port, a second master port, and a second slave port.

The first master port and the first slave port may be for transferring a control command signal (for example, CMD of FIG. 7) to an adjacent timing controller through a forward SPI F-SPI. The second master port and the second slave port may be for transferring a control response signal (for example, ACK of FIG. 7) to an adjacent timing controller through a reverse SPI R-SPI.

Referring to FIG. 6, a second interface circuit which connects a set board SET to first to $n^{th}$ timing controllers TCON #1 to TCON #n of display modules may be implemented based on a unidirectional V-by-One (Vx1) scheme capable of high-speed and large-capacity data interfacing.

Figure 7:
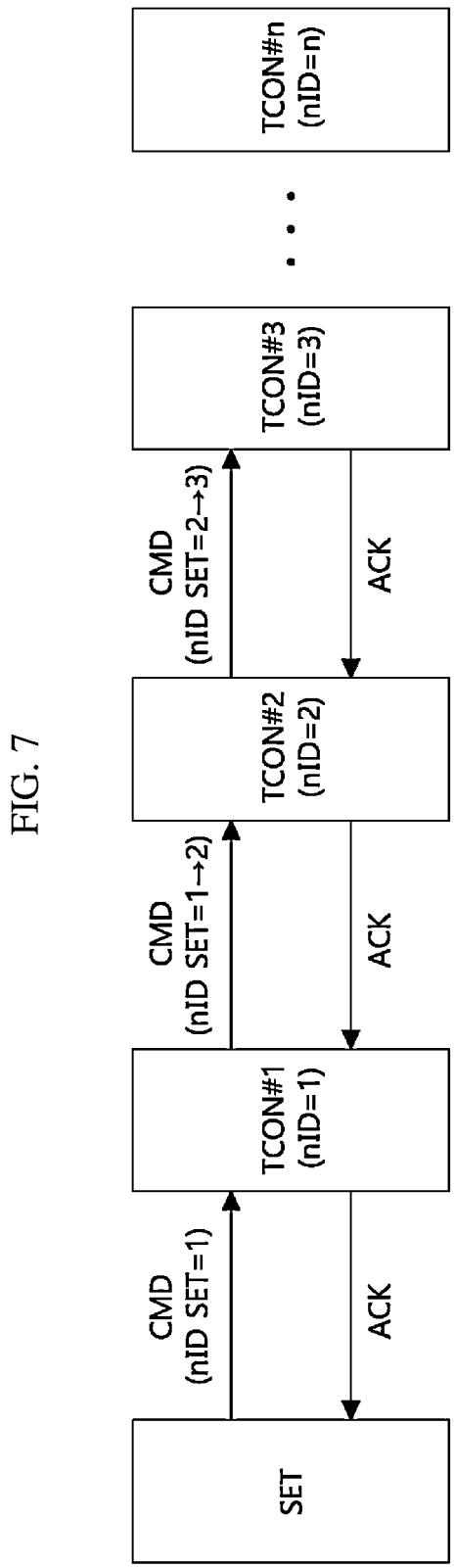
FIGS. 7 and 8 are diagrams illustrating a configuration of an embodiment where a module identification number for image division is automatically set in a tiling display apparatus.
Figure 8:
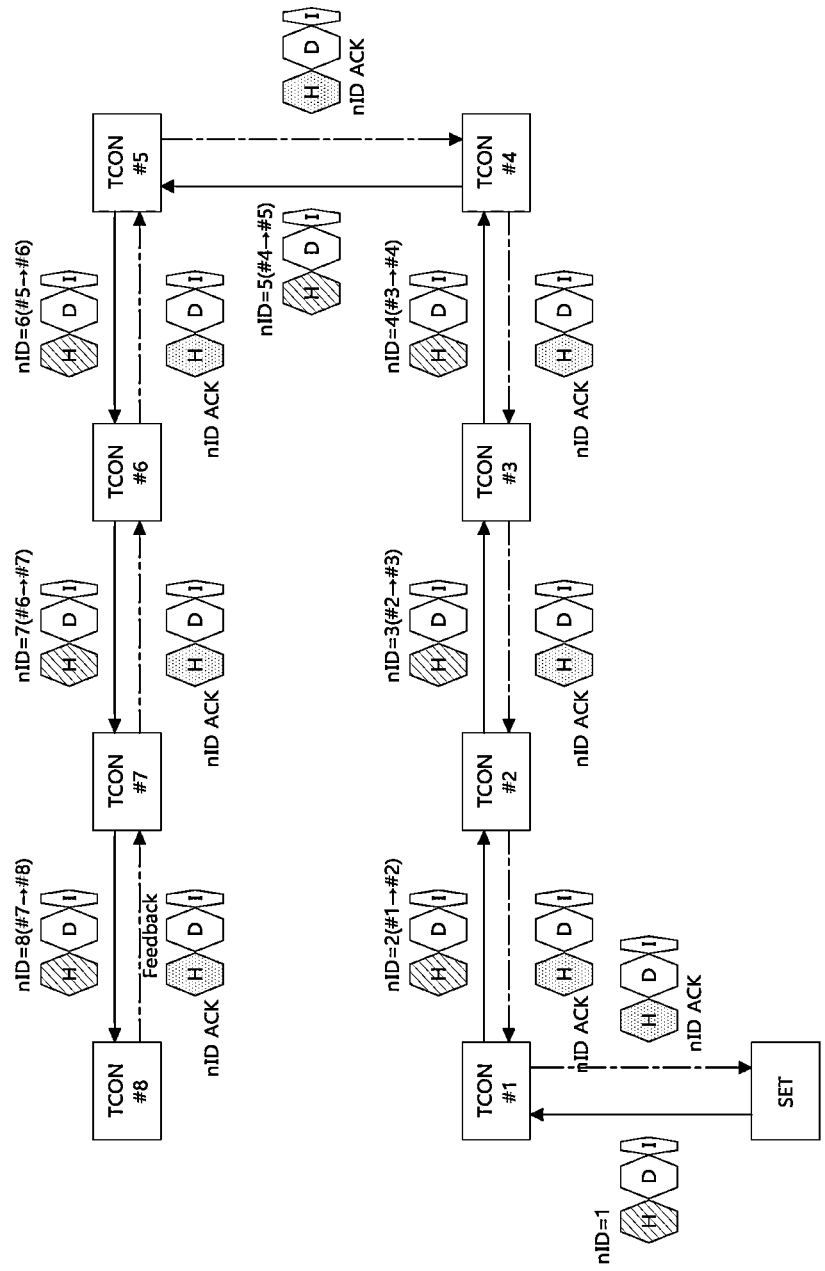

FIGS. 7 and 8 are diagrams illustrating a configuration of an embodiment where a module identification number for image division is automatically set in a tiling display apparatus according to an embodiment of the present disclosure.

Referring to FIG. 7, first to $n^{th}$ timing controllers TCON #1 to TCON #n may sequentially generate a module identification number in response to a control command signal CMD through a first interface circuit and may feedback a control response signal ACK including a result thereof to the set board SET through the first interface circuit. Such an "Auto nID setting process" may be performed in a power-on sequence period. The power-on sequence period may be a time until a screen is displayed from after an operation power is turned on, in the tiling display apparatus.

The "Auto nID setting process" will be described below with reference to FIG. 8.

A control command signal CMD generated by the set board SET may be sequentially updated and transferred to the first to eighth timing controllers TCON #1 to TCON #8 through a forward SPI. A 1 data transfer packet may be divided into a head region H, a data region D, and an information region I, and the control command signal CMD for generating a module identification number may be located in the head region H. Each of the first to eighth timing controllers TCON #1 to TCON #8 may check an auto nID generating command signal and an nID setting value in the head region H to generate a module identification number thereof. Also, each of the first to seventh timing controllers TCON #1 to TCON #7 may add 1 to an nID value thereof to update the nID setting value of the head region H, and then, may transfer a new nID setting value to a subsequent timing controller.

The control response signal ACK generated by each of the first to eighth timing controllers TCON #1 to TCON #8 may be transferred to the set board SET through a reverse SPI. The control response signal ACK may be located in the head region H of the 1 data transfer packet. Each of the first to eighth timing controllers TCON #1 to TCON #8 may check an ACK command signal in the head region H to generate a control response signal ACK thereof, update the control response signal ACK to the head region H, and transfer the control response signal ACK to a subsequent timing controller.

The set board SET may check the control response signal ACK, and when the control response signal ACK is normal, the set board SET may end the "Auto nID setting process".

The set board SET may perform an "Auto image coordinate recognition process" after the "Auto nID setting process" ends. The "Auto image coordinate recognition process" may be a process which sets image re-matching control information and a module image coordinate value corresponding to a module image for each display panel, on the basis of a placement direction of a control PCB individually included in each display module. The "Auto image coordinate recognition process" may be executed in a power-on sequence period.

Figure 9:
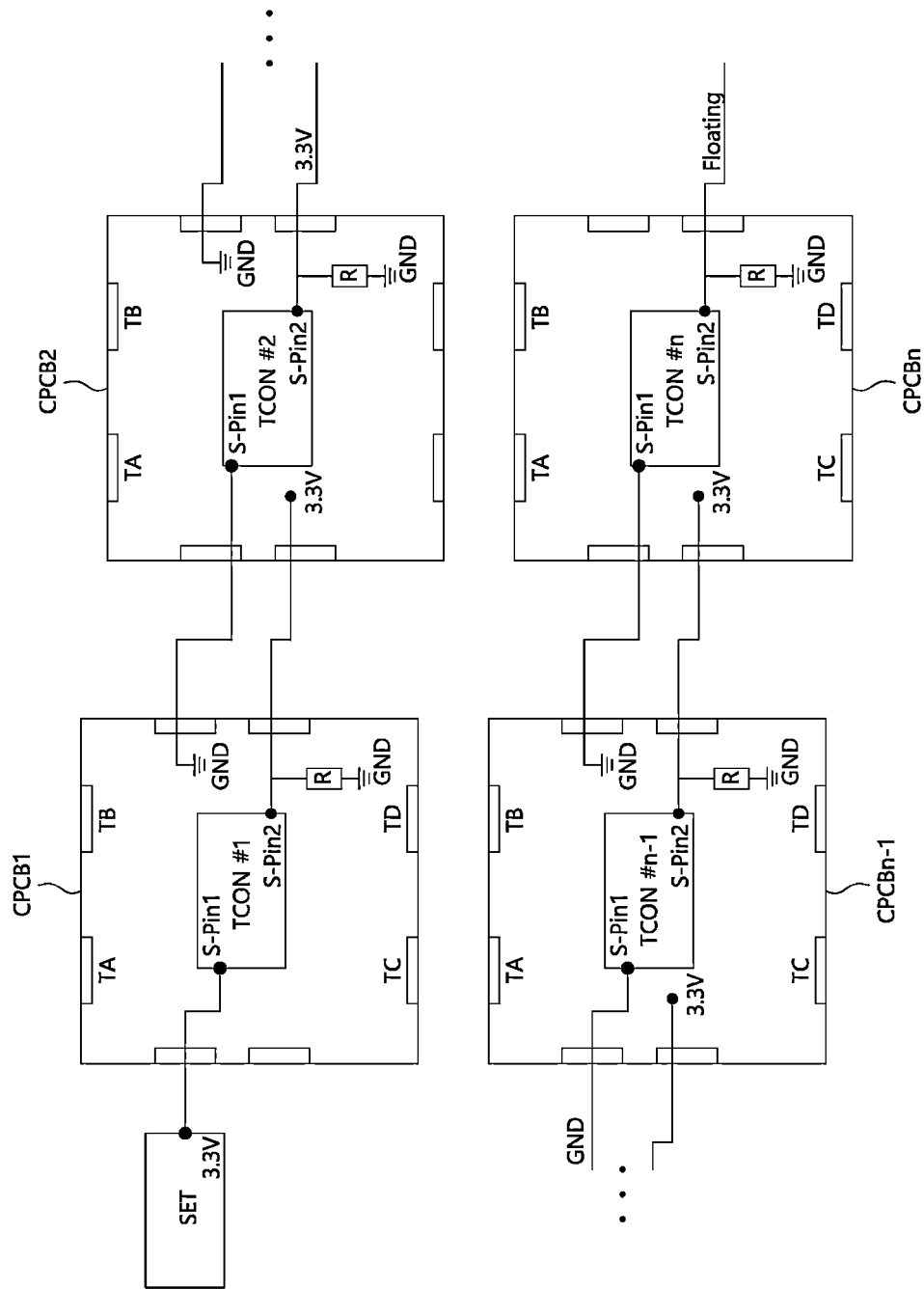
FIG. 9 is a diagram illustrating a connection structure between first and second option pins of each display module for an automatic setting of a module identification number according to an embodiment of the present disclosure.

FIG. 9 is a diagram illustrating a connection structure between first and second option pins of each display module for an automatic setting of a module identification number according to an embodiment of the present disclosure.

Referring to FIG. 9, first to $n^{th}$ timing controllers TCON #1 to TCON #n may be respectively mounted on first to $n^{th}$ control PCBs CPCB1 to CPCBn. In the first to $n^{th}$ timing controllers TCON #1 to TCON #n, the first timing controller TCON #1 may be a first timing controller connected to a set board SET, and the $n^{th}$ timing controller TCON #n may be a last timing controller. The set board SET may at least automatically recognize a connection position between the first timing controller TCON #1 and the $n^{th}$ timing controller TCON #n, for an "Auto nID setting process".

To this end, the first timing controller TCON #1 may include a first option pin S-Pin1 connected to a high logic power source (3.3V) and a second option pin S-Pin2 connected to the high logic power source (3.3V). The set board SET may recognize that the first timing controller TCON #1 is a first timing controller directly connected thereto, on the basis of a logic combination '11' of the first and second option pins S-Pin1 and S-Pin2 of the first timing controller TCON #1.

Moreover, the $n^{th}$ timing controller TCON #n may include a first option pin S-Pin1 connected to a low logic power source (GND) and a floated second option pin S-Pin2. The n$^{th}$ timing controller TCON #n may recognize a floating voltage of the second option pin S-Pin2 as a low logic voltage. The set board SET may recognize that the n$^{th}$ timing controller TCON #n is a last timing controller, on the basis of a logic combination '00' of the first and second option pins S-Pin1 and S-Pin2 of the n$^{th}$ timing controller TCON #n.

Furthermore, the second to n−1$^{th}$ timing controllers TCON #2 to TCON #n−1 other than the first timing controller TCON #1 and the n$^{th}$ timing controller TCON #n may include a first option pin S-Pin1 connected to the low logic power source (GND) and a second option pin S-Pin2 connected to the high logic power source (3.3V). The n$^{th}$ timing controller TCON #n may recognize a floating voltage of the second option pin S-Pin2 as a low logic voltage. The set board SET may recognize that the second to n−1$^{th}$ timing controllers TCON #2 to TCON #n−1 are timing controllers disposed between the first timing controller and the last timing controller, on the basis of a logic combination '01' of the first and second option pins S-Pin1 and S-Pin2 of each of the second to n−1$^{h}$ timing controllers TCON #2 to TCON #n−1.

FIGS. 10A to 10D are exemplary diagrams illustrating a non-formal connection structure between display modules for implementing a tiling display apparatus according to an embodiment of the present disclosure.

Referring to FIGS. 10A to 10D, a connection structure between display modules may be non-formal, on the basis of a connection position of a set board SET and a method of manufacturing a system.

The display modules may display a module image divided from an input image. Control PCBs included in the display modules may be electrically connected to one another through an interface cable CBL. Timing controllers TCON #1 to TCON #8 mounted on the control PCBs may be connected to panel driving circuits through internal interface lines. An input/output direction of image data may be designed to be fixed in a control PCB, so that internal interface lines are not twisted in a connection state where the display modules are connected to one another. That is, with respect to a control PCB arranged in a forward direction, a control PCB may be designed so that image data is input to a timing controller from a left direction of the control PCB and is output in a right direction of the control PCB from the timing controller. Based on an input/output direction of image data corresponding to the control PCB and a length of an interface cable CBL between adjacent timing controllers, control PCBs arranged in an odd-numbered row may be arranged in a first direction, and control PCBs arranged in an even-numbered row may be arranged in a second direction opposite to the first direction.

Figure 10A:
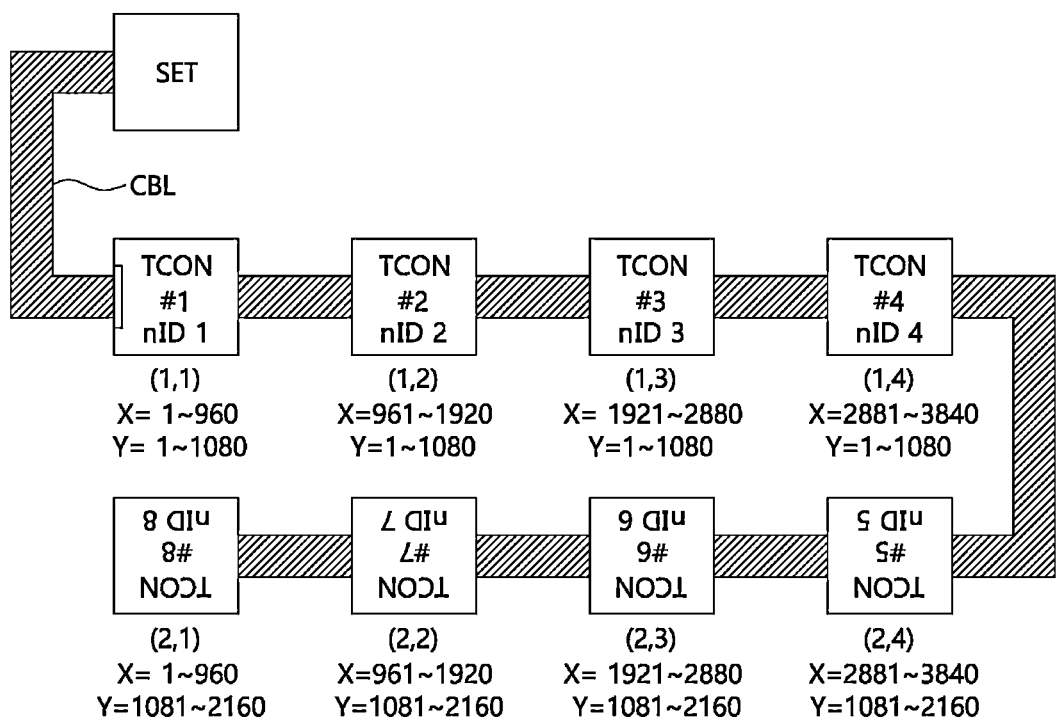
FIGS. 10A to 10D are exemplary diagrams illustrating a non-formal connection structure between display modules for implementing a tiling display apparatus according to an embodiment of the present disclosure.

For example, as in FIG. 10A, control PCBs (corresponding to TCON #1 to TCON #4) arranged in a first row may be arranged in a forward direction, and control PCBs (corresponding to TCON #5 to TCON #8) arranged in a second row may be arranged in a reverse direction. The set board SET may determine a placement direction of a control PCB on the basis of logic value information about a direction recognition pin set in a timing controller of the control PCB. The set board SET may set image re-matching control information and module image coordinate values (1,1) to (2,4) corresponding to a module image, on the basis of module identification numbers nID 1 to nID 8 assigned to the timing controllers TCON #1 to TCON #8 and a placement direction in which the control PCBs are arranged. When a module image coordinate value is "(a, b)", "a" may denote row coordinates where a module image is located in an input image, and "b" may denote column coordinates where the module image is located in the input image. In this case, a module image coordinate value (1,1) may be set in a first display module including a first timing controller TCON #1, and a module image coordinate value (2,4) may be set in a fifth display module including a fifth timing controller TCON #5. When a total resolution of an input image is 3840*2160, the module image coordinate value (1,1) may represent a module image having a unit horizontal resolution X "1 to 960" and a unit vertical resolution Y "1 to 1080", and the module image coordinate value (2,4) may represent a module image having a unit horizontal resolution X "2881 to 3840" and a unit vertical resolution Y "1081 to 2160".

Figure 10B:
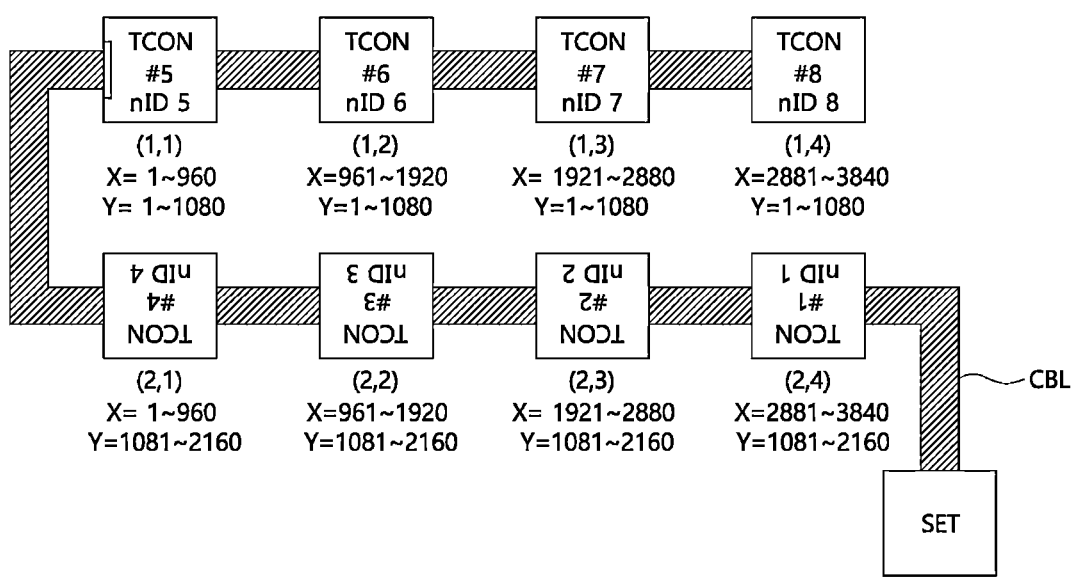

Moreover, as in FIG. 10B, control PCBs (corresponding to TCON #5 to TCON #8) arranged in a first row may be arranged in a forward direction, and control PCBs (corresponding to TCON #1 to TCON #4) arranged in a second row may be arranged in a reverse direction. The set board SET may determine a placement direction of a control PCB on the basis of logic value information about a direction recognition pin set in a timing controller of the control PCB. In this case, a module image coordinate value (2,4) may be set in a first display module including a first timing controller TCON #1, and a module image coordinate value (1,1) may be set in a fifth display module including a fifth timing controller TCON #5. When a total resolution of an input image is 3840*2160, the module image coordinate value (1,1) may represent a module image having a unit horizontal resolution X "1 to 960" and a unit vertical resolution Y "1 to 1080", and the module image coordinate value (2,4) may represent a module image having a unit horizontal resolution X "2881 to 3840" and a unit vertical resolution Y "1081 to 2160".

Figure 10C:
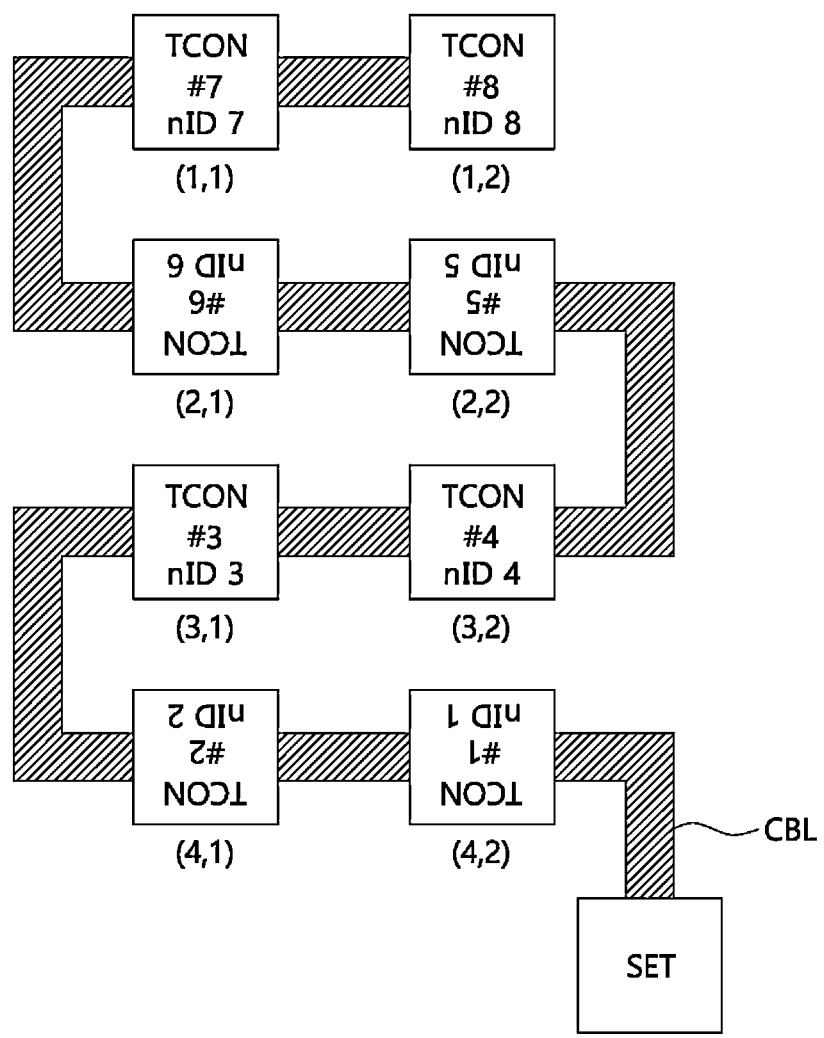

Moreover, as in FIG. 10C, control PCBs (corresponding to TCONs #3, 4, 7, and 8) arranged in an odd-numbered row may be arranged in a forward direction, and control PCBs (corresponding to TCONs #1, 2, 5, and 6) arranged in an even-numbered row may be arranged in a reverse direction. The set board SET may determine a placement direction of a control PCB on the basis of logic value information about a direction recognition pin set in a timing controller of the control PCB. In this case, a module image coordinate value (4,2) may be set in a first display module including a first timing controller TCON #1, and a module image coordinate value (2,2) may be set in a fifth display module including a fifth timing controller TCON #5.

Figure 10D:
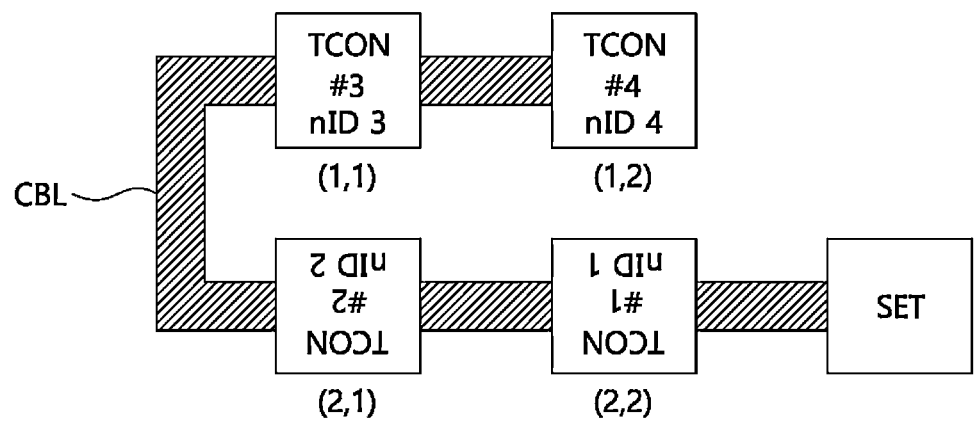

Based on the same method, as in FIG. 10D, a module image coordinate value (2,2) may be set in a first timing controller TCON #1, a module image coordinate value (2,1) may be set in a second timing controller TCON #2, a module image coordinate value (1,1) may be set in a third timing controller TCON #3, and a module image coordinate value (1,2) may be set in a fourth timing controller TCON #4.

In FIGS. 10A to 10D, a module image may be redistributed to four image output ports installed in a control PCB, and thus, may be divided and displayed in four display panels. An operation of dividing one module image into four sub-images may be performed in all timing controllers. A sub-image re-matching operation may be performed by only a specific timing controller so as to prevent an image inversion/mixing phenomenon occurring when a module image is divided into sub-images. That is, the sub-image re-matching operation may be performed based on image re-matching control information input from the set board SET and may be relevant to only control PCBs arranged in a direction which differs from a predetermined default direction. Each of timing controllers mounted on control PCBs arranged in a direction differing from the default direction may be redistributed to four image output ports unlike a predetermined default distribution order, thereby preventing the distortion of an image.

Figure 11A:
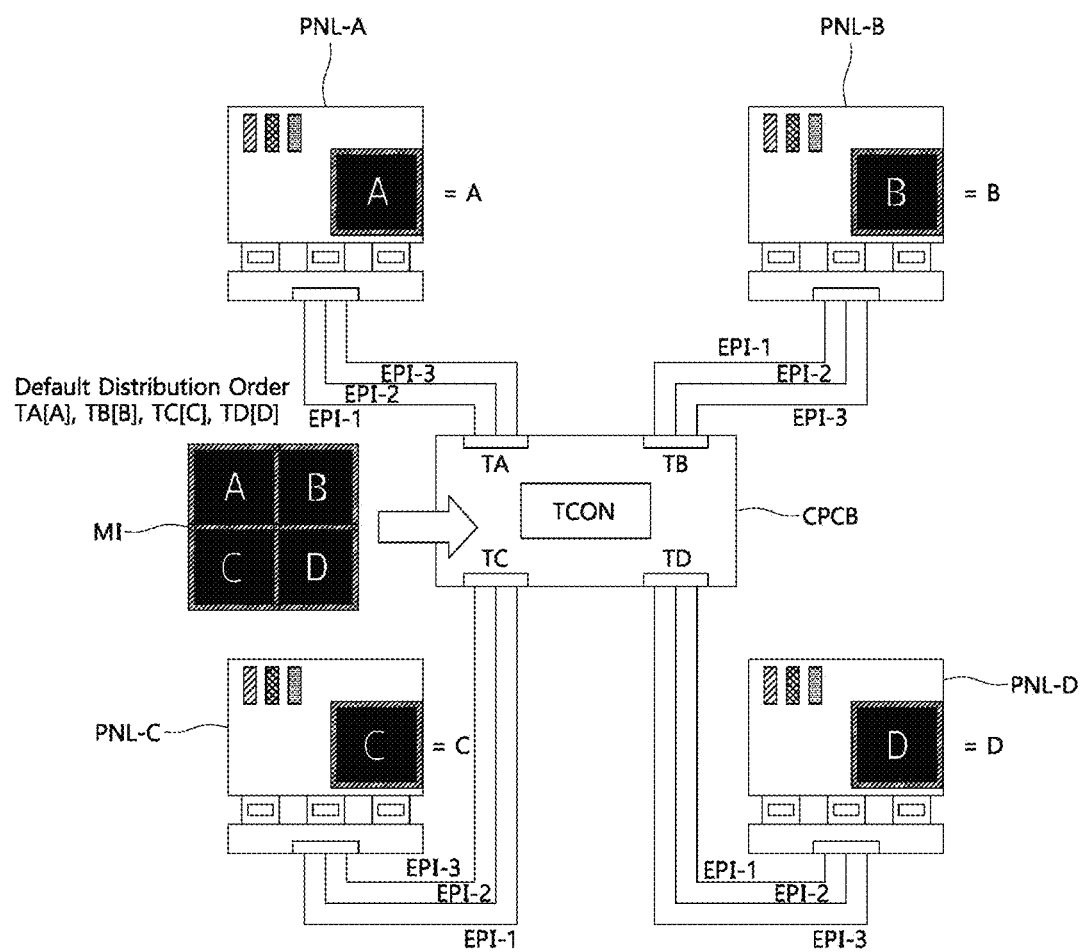
FIG. 11A is a diagram illustrating an example where an input image and an output image are identically matched with a default distribution order in a default placement structure of a control printed circuit board (PCB) according to an embodiment of the present disclosure.
Figure 11B:
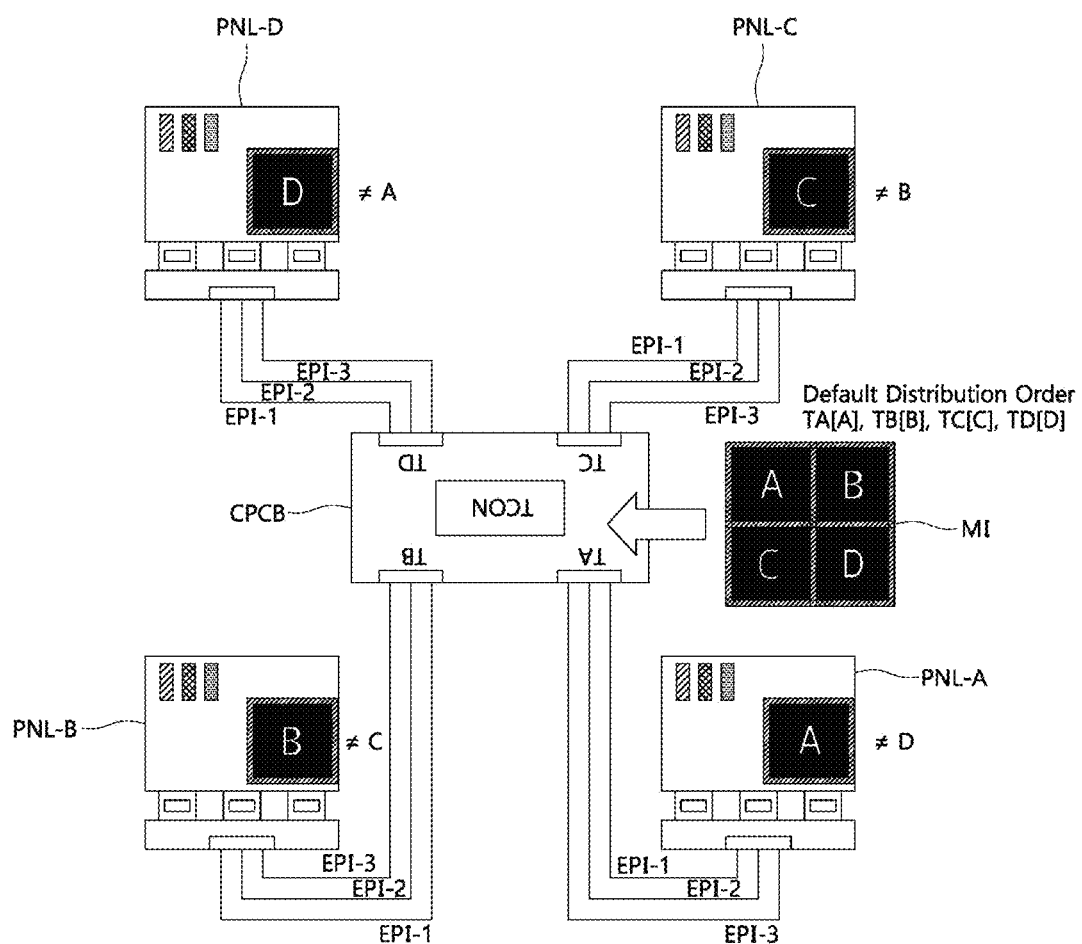
FIG. 11B is a diagram illustrating an example where an input image and an output image are not identically matched with a default distribution order in a reversed placement structure of a control PCB according to an embodiment of the present disclosure.

FIG. 11A is a diagram illustrating an example where an input image and an output image are identically matched with a default distribution order in a default placement structure of a control PCB according to an embodiment of the present disclosure. FIG. 11B is a diagram illustrating an example where an input image and an output image are not identically matched with a default distribution order in a reversed placement structure of a control PCB according to an embodiment of the present disclosure.

In FIGS. 11A and 11B, a default direction may be a forward direction. In 11A and 11B, "EPI-1, EPI-2, and EPI-3" may each be an internal interface line for data communication between a timing controller TCON and panel driving circuits.

Referring to FIG. 11A, when a module image MI is input to a display module where a control PCB CPCB is arranged in a default direction, a timing controller TCON may divide the module image MI into four sub-images A, B, C, and D and may distribute the sub-images A, B, C, and D to four output ports on the basis of a default distribution order.

Referring to FIG. 11B, when a module image MI is input to a display module where a control PCB CPCB is arranged in a direction rotated by 180 degrees from a default direction, a timing controller TCON may divide the module image MI into four sub-images A, B, C, and D and may distribute the sub-images A, B, C, and D to four output ports unlike a default distribution order.

According to a default distribution order TA[A], TB[B], TC[C], TD[D], a timing controller TCON may output a sub-image A to a first display panel PNL-A through a first output port TA, output a sub-image B to a second display panel PNL-B through a second output port TB, output a sub-image C to a third display panel PNL-C through a third output port TC, and output a sub-image D to a fourth display panel PNL-D through a fourth output port TD.

Referring to FIG. 11A, an output image implemented in display panels may identically match an input module image MI. That is, the module image MI may be intactly displayed by four display panels without image inversion or image mixing. Therefore, as shown in FIG. 11A, in a display module where a control PCB CPCB is arranged in the default direction, a sub-image re-matching operation may not be performed. In this case, image data of sub-images may be distributed to first to fourth output ports TA, TB, TC, and TD identically to the default distribution order.

On the other hand, according to FIG. 11B, an output image implemented in display panels may not match an input module image MI. That is, the input module image MI may be displayed by four display panels with being inversed. Therefore, as in FIG. 11B, in a display module where a control PCB CPCB is arranged in a direction rotated by 180 degrees from the default direction, a sub-image re-matching operation may be needed for removing image inversion, and image data of sub-images may be distributed to first to fourth output ports TA, TB, TC, and TD unlike the default distribution order. In other words, a sub-image A may re-match the fourth output port TD, a sub-image B may re-match the third output port TC, a sub-image C may re-match the second output port TB, and a sub-image D may re-match the first output port TA.

Figure 12A:
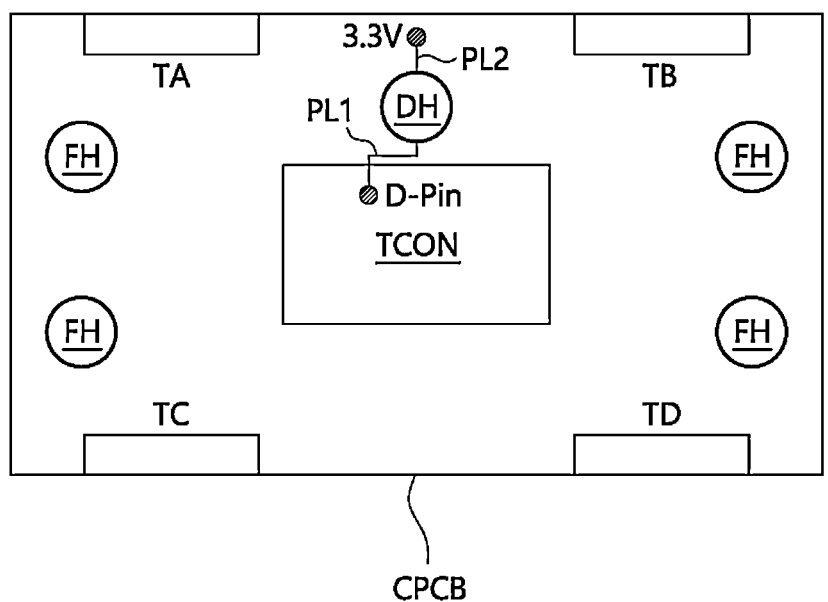
FIGS. 12A to 12B are diagrams illustrating an overall connection structure of each display module for automatically recognizing a placement direction of a control PCB according to a first embodiment of the present disclosure.
Figure 12B:
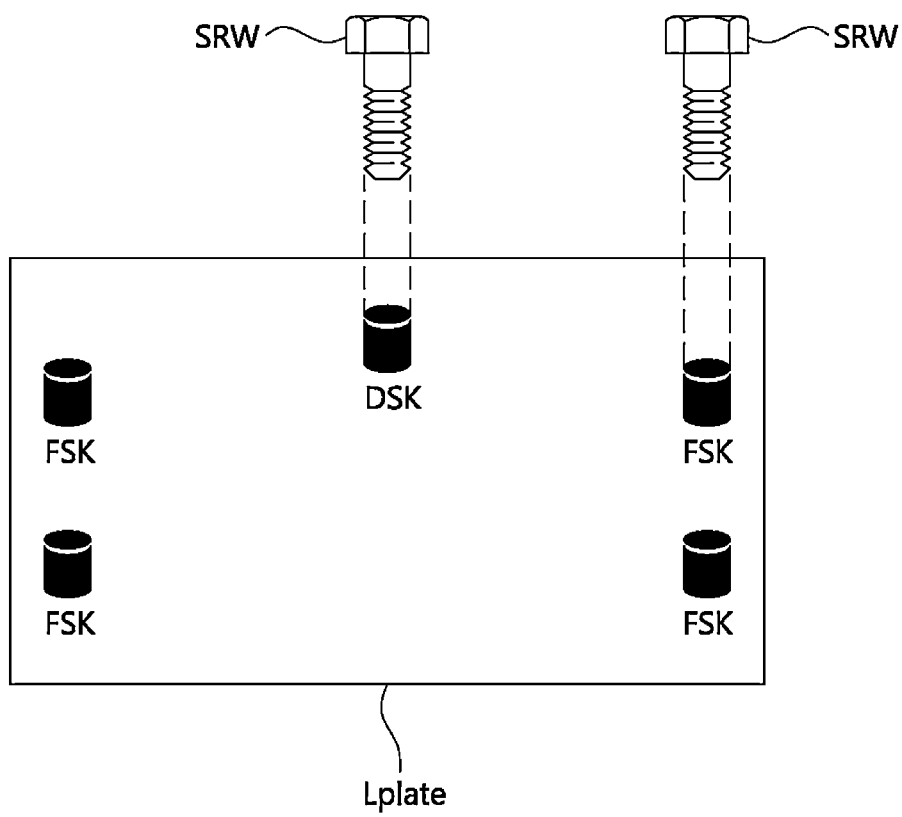
Figure 13:
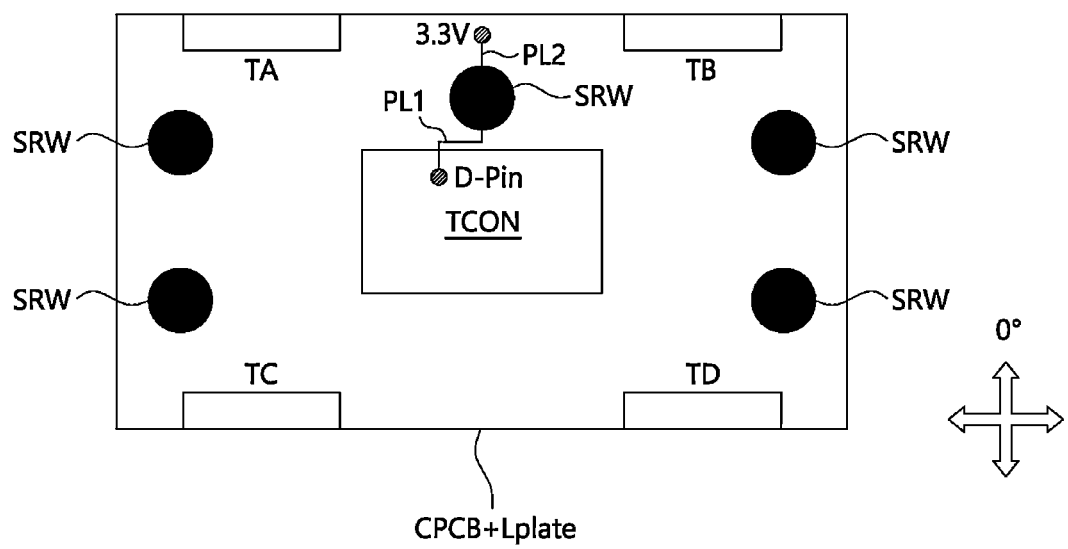
FIGS. 13 and 14 are diagrams illustrating an example where a control PCB is connected to a lower plate with being rotated by each of 0 degrees and 180 degrees from a specific direction, in a display module according to the first embodiment of the present disclosure.
Figure 14:
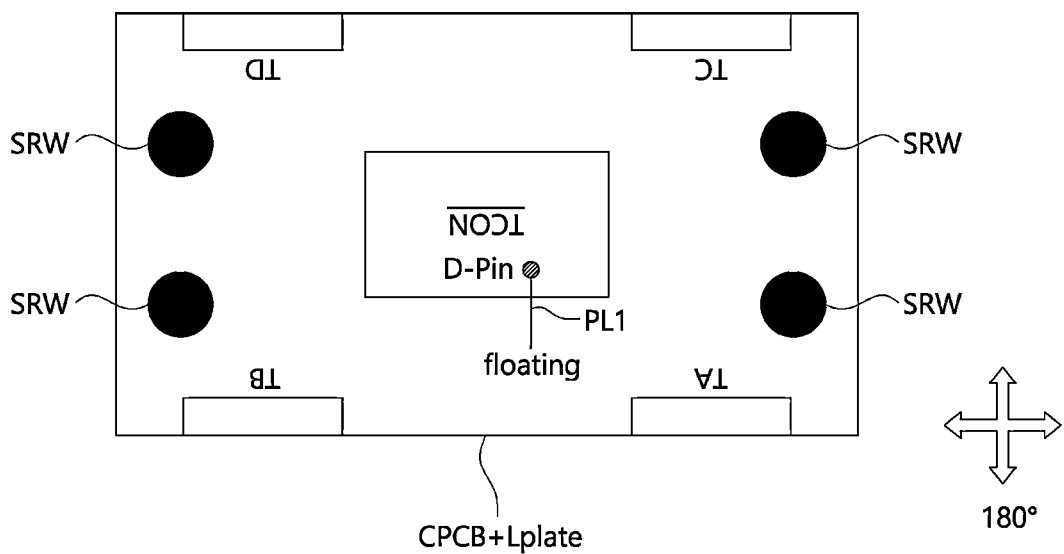
Figures 15, 16A:
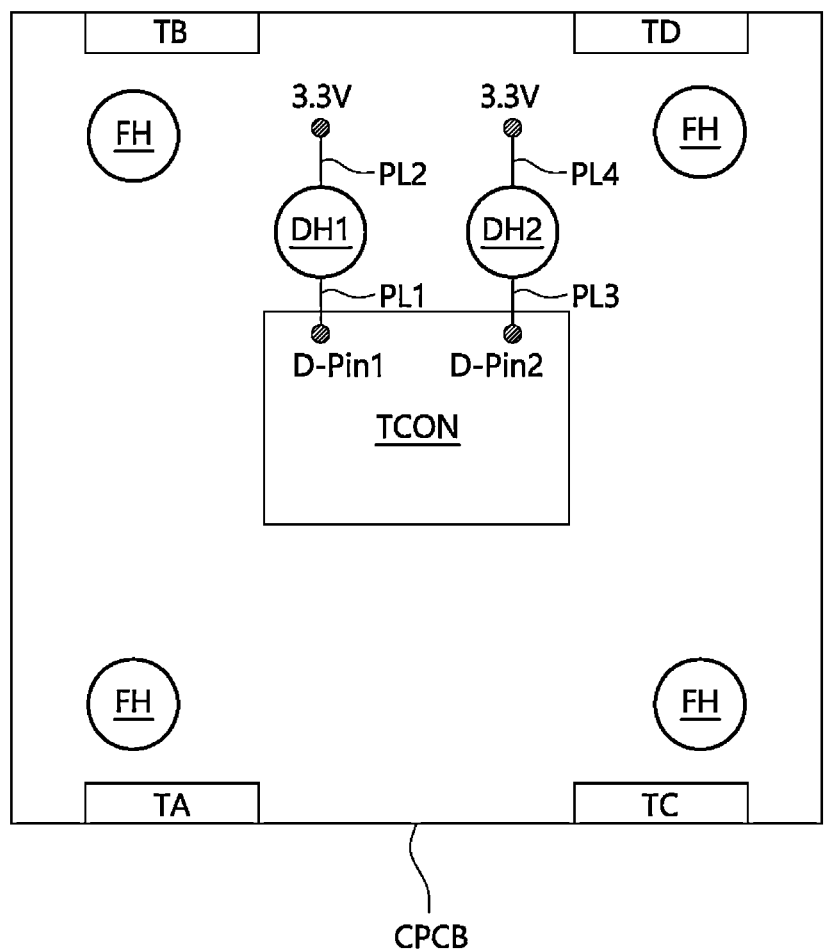
FIG. 15 is a diagram illustrating a logic value of a direction recognition pin based on a placement direction of a control PCB in a display module according to the first embodiment.
FIGS. 16A to 16C are diagrams illustrating an overall connection structure of each display module for automatically recognizing a placement direction of a control PCB according to a second embodiment of the present disclosure.

FIGS. 12A to 12B are diagrams illustrating an overall connection structure of each display module for automatically recognizing a placement direction of a control PCB according to a first embodiment of the present disclosure. FIGS. 13 and 14 are diagrams illustrating an example where a control PCB is connected to a lower plate with being rotated by each of 0 degrees and 180 degrees from a specific direction, in a display module according to the first embodiment. FIG. 15 is a diagram illustrating a logic value of a direction recognition pin based on a placement direction of a control PCB in a display module according to the first embodiment.

Referring to FIGS. 12A to 12B, each display module may further include a lower plate Lplate coupled to a rear surface of a control PCB CPCB.

A timing controller TCON may be mounted on the control PCB CPCB. The timing controller TCON may be fixed to the control PCB CPCB, and thus, a placement direction of the timing controller TCON may be changed based on a placement direction of the control PCB CPCB. In order to represent two placement directions of the control PCB CPCB, a first direction recognition pin D-Pin may be included in the timing controller TCON. The first direction recognition pin D-Pin may represent two pieces of direction information (for example, forward placement direction information and reverse placement direction information) having different logic values on the basis of the placement direction of the control PCB CPCB.

A plurality of sub-holes FH for coupling to the lower plate Lplate and a first power connection hole DH for connection to a high logic power source may be formed in the control PCB CPCB. The first power connection hole DH may be formed at a first upper position near a region with the timing controller TCON mounted therein. The first power connection hole DH may be connected to the first direction recognition pin D-Pin of the timing controller TCON through a first power line PL1 and may be connected to a high logic power source (3.3V) through a second power line PL2.

The lower plate Lplate may be coupled to the control PCB CPCB with being fixed to a specific direction (for example, a forward direction), regardless of changing a placement direction of the control PCB CPCB. A first coupling socket DSK may be provided at a first lower position of the lower plate Lplate. A plurality of sub-sockets FSK corresponding to the sub-holes FH of the control PCB CPCB may be provided in the lower plate Lplate. The sub-holes FH may be coupled to the sub-sockets FSK by using a conductive coupler SRW, but the present disclosure is not limited thereto. An element for coupling the sub-holes FH to the sub-sockets FSK may not necessarily be a conductor.

Based on a placement direction of the control PCB CPCB, a first upper position of the control PCB CPCB may overlap a first lower position of the lower plate Lplate, or may not overlap. When the first upper position overlaps the first lower position, the first power connection hole DH may be coupled to the first coupling socket DSK by a first conductive coupler SRW. On the other hand, when the first upper position does not overlap the first lower position, the first power connection hole DH may not be coupled to the first coupling socket DSK by the first conductive coupler SRW.

For example, as in FIG. 13, when a placement direction of the control PCB is a forward direction (0 degrees) which is the same as the specific direction, the first upper position may overlap the first lower position and the first power connection hole DH may be coupled to the first coupling socket DSK by the first conductive coupler SRW, and thus, the high logic power source (3.3V) may be connected to the first direction recognition pin D-Pin of the timing controller TCON through the first and second power lines PL1 and PL2 and the first conductive coupler SRW. As a result, as in FIG. 15, the timing controller TCON may transfer forward placement direction information having a logic value '1' to a set board.

On the other hand, as in FIG. 14, when the placement direction of the control PCB is a reverse direction (180 degrees) opposite to the specific direction, the first upper position may not overlap the first lower position and the first power connection hole DH may not be coupled to the first coupling socket DSK, and thus, the high logic power source (3.3V) may not be connected to the first direction recognition pin D-Pin of the timing controller TCON. The first direction recognition pin D-Pin of the timing controller TCON may not be connected to the high logic power source (3.3V) and may be floated. As a result, as in FIG. 15, the timing controller TCON may transfer reverse placement direction information having a logic value '0' to the set board.

Figure 16B:
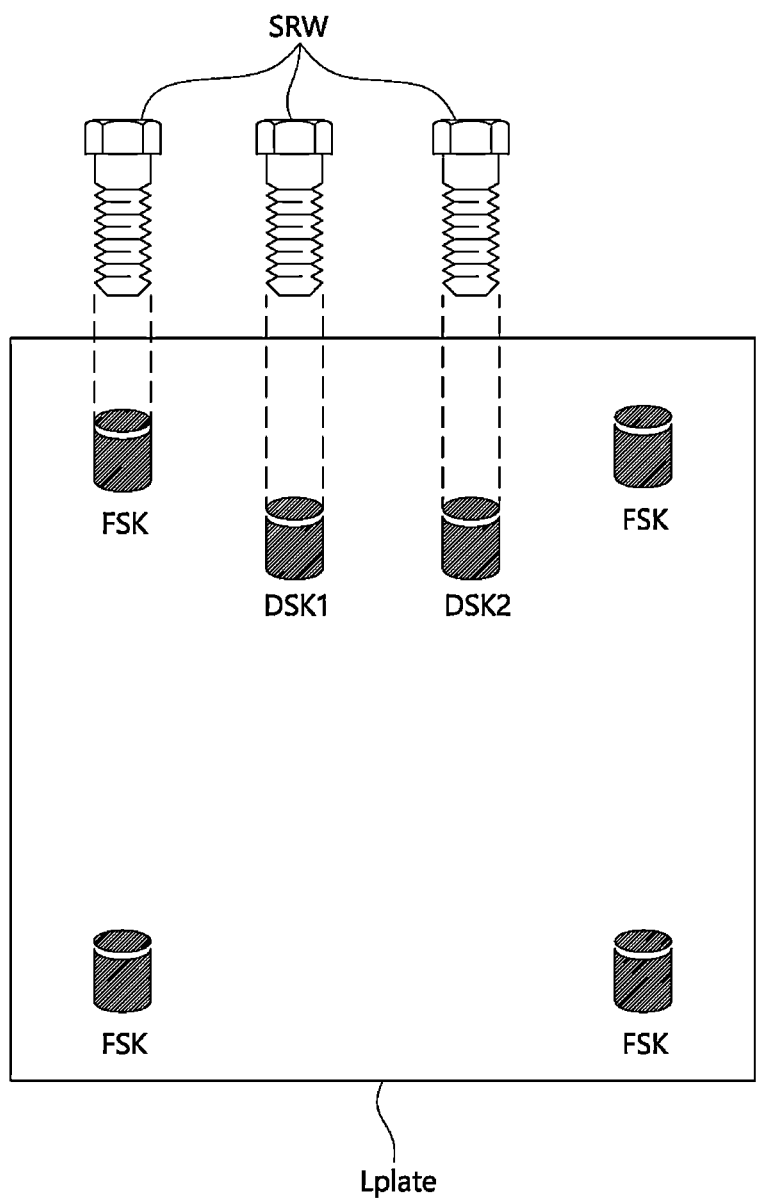
Figure 16C:
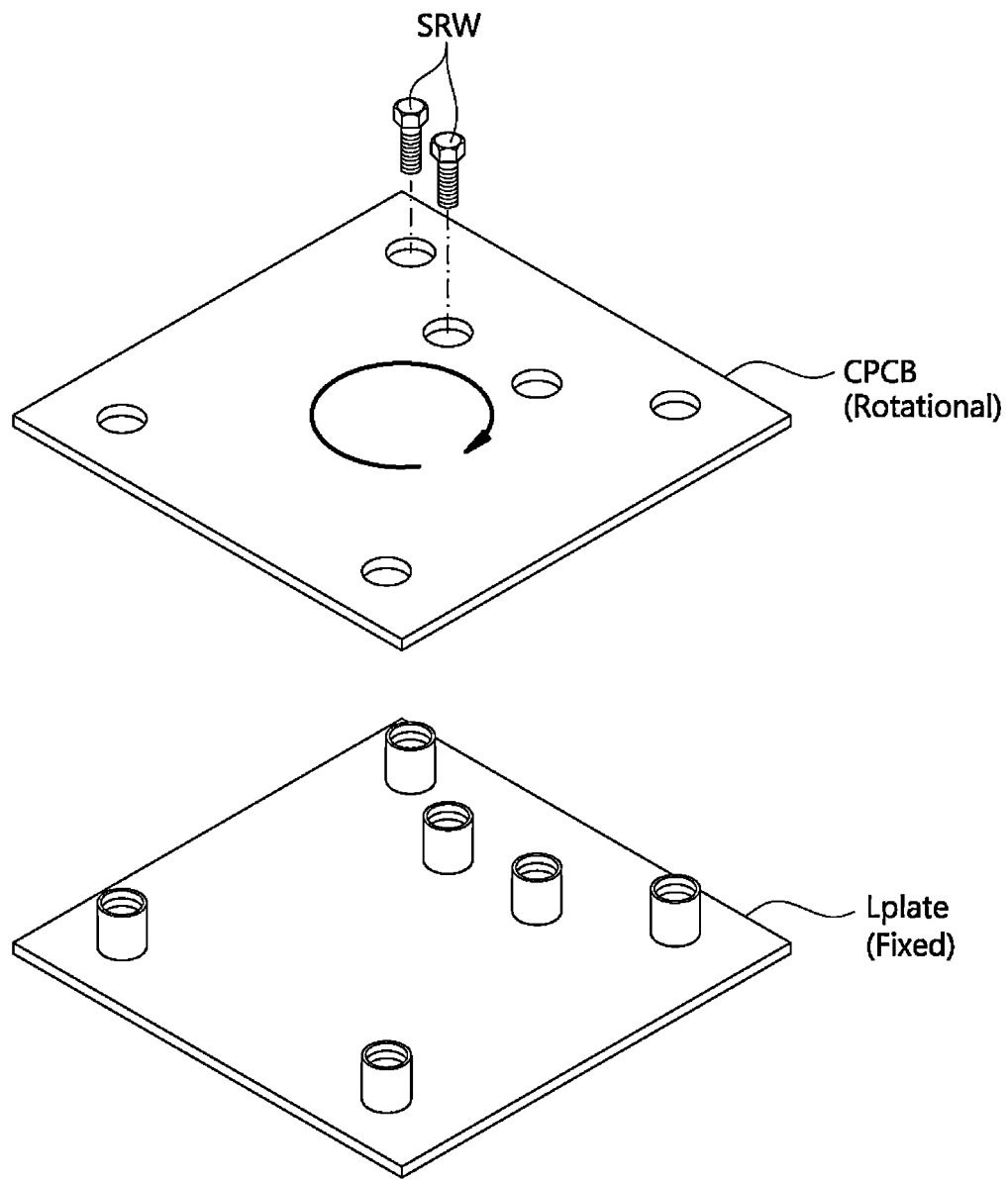

FIGS. 16A to 16C are diagrams illustrating an overall connection structure of each display module for automatically recognizing a placement direction of a control PCB according to a second embodiment. FIGS. 17 to 20 are diagrams illustrating an example where a control PCB is connected to a lower plate with being rotated by each of 270 degrees, 90 degrees, 0 degrees, and 180 degrees from a specific direction, in a display module according to the second embodiment. FIG. 21 is a diagram illustrating logic values of first and second direction recognition pins based on a placement direction of a control PCB in a display module according to the second embodiment.

Referring to FIGS. 16A to 16C, each display module may further include a lower plate Lplate coupled to a rear surface of a control PCB CPCB.

A timing controller TCON may be mounted on the control PCB CPCB. The timing controller TCON may be fixed to the control PCB CPCB, and thus, a placement direction of the timing controller TCON may be changed based on a placement direction of the control PCB CPCB. In order to represent four placement directions of the control PCB CPCB, a first direction recognition pin D-Pin1 and a second direction recognition pin D-Pin2 may be included in the timing controller TCON. The first direction recognition pin D-Pin1 and the second direction recognition pin D-Pin2 may represent four pieces of direction information (for example, 0-dgree, 90-degree, 180-degree, and 270-degree placement direction information) having different logic values on the basis of the placement direction of the control PCB CPCB.

A plurality of sub-holes FH for coupling to the lower plate Lplate and first and second power connection holes DH1 and DH2 for connection to a high logic power source may be formed in the control PCB CPCB. The first power connection hole DH1 may be formed at a first upper position near a region with the timing controller TCON mounted therein, and the second power connection hole DH2 may be formed at a second upper position near a region with the timing controller TCON mounted therein. The first power connection hole DH1 may be connected to the first direction recognition pin D-Pin1 of the timing controller TCON through a first power line PL1 and may be connected to a high logic power source (3.3V) through a second power line PL2. The second power connection hole DH2 may be connected to the second direction recognition pin D-Pin2 of the timing controller TCON through a third power line PL3 and may be connected to the high logic power source (3.3V) through a fourth power line PL4.

The lower plate Lplate may be coupled to the control PCB CPCB with being fixed to a specific direction (for example, 0 degrees and a forward direction), regardless of changing a placement direction of the control PCB CPCB. A first coupling socket DSK1 may be provided at a first lower position of the lower plate Lplate, and a second coupling socket DSK2 may be provided at a second lower position of the lower plate Lplate. A plurality of sub-sockets FSK corresponding to the sub-holes FH of the control PCB CPCB may be provided in the lower plate Lplate. The sub-holes FH may be coupled to the sub-sockets FSK by using a conductive coupler SRW, but the present disclosure is not limited thereto.

The number of sub-holes FH and the number of sub-sockets FSK may be implemented to be equal so that mechanical coupling between the control PCB CPCB and the lower plate Lplate is possible regardless of a placement direction of the control PCB CPCB. Particularly, it may be designed that an interval between adjacent sub-holes FH is equal to an interval between adjacent sub-sockets FSK.

Based on a placement direction of the control PCB CPCB, at least one of first and second upper positions of the control PCB CPCB may overlap at least one of first and second lower positions of the lower plate Lplate, or may not overlap. When at least one of the first and second upper positions overlaps at least one of the first and second lower positions, the first and second power connection holes DH1 and DH2 may be coupled to at least one of the first and second coupling sockets DSK1 and DSK2 by at least one of first and second conductive couplers SRW. On the other hand, when at least one of the first and second upper positions does not overlap at least one of the first and second lower positions, the first and second power connection holes DH1 and DH2 may not be coupled to the first and second coupling sockets DSK1 and DSK2 by the first and second conductive couplers SRW.

Figure 17:
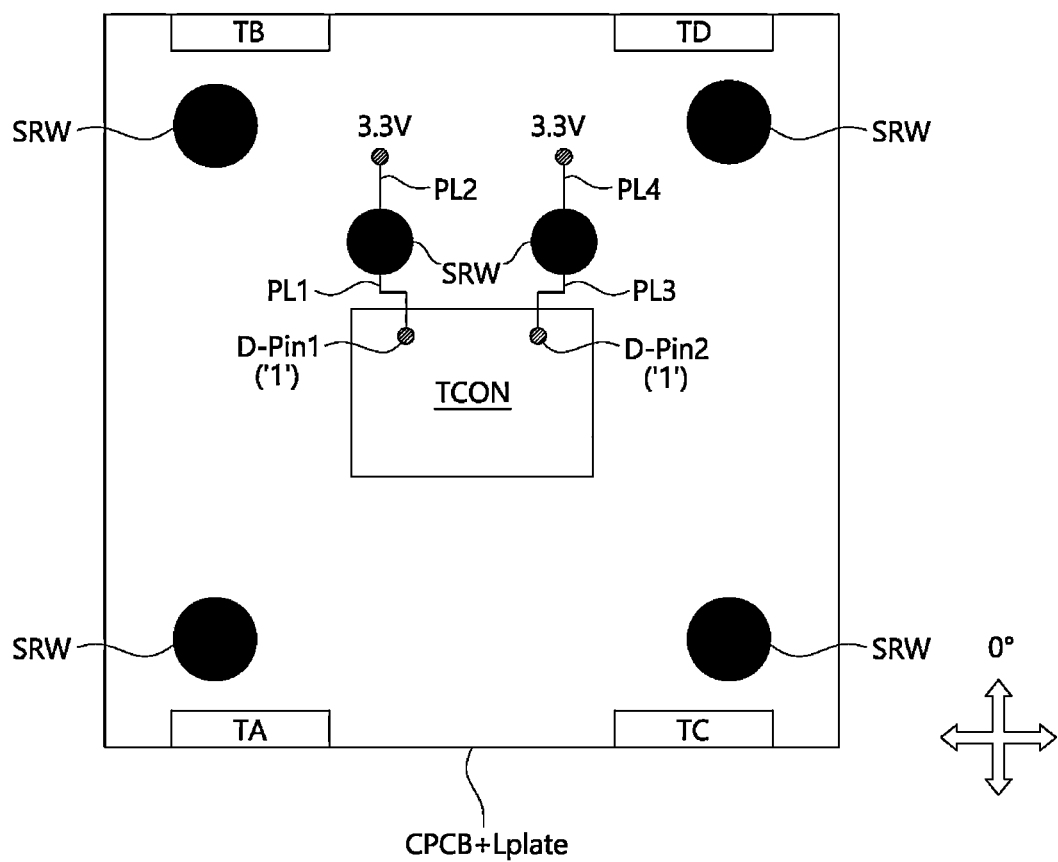
FIGS. 17 to 20 are diagrams illustrating an example where a control PCB is connected to a lower plate with being rotated by each of 270 degrees, 90 degrees, 0 degrees, and 180 degrees from a specific direction, in a display module according to the second embodiment.

For example, as in FIG. 17, when a placement direction of the control PCB is a forward direction (0 degrees) which is the same as the specific direction, the first upper position may overlap the first lower position and the first power connection hole DH1 may be coupled to the first coupling socket DSK1 by the first conductive coupler SRW, and thus, the high logic power source (3.3V) may be connected to the first direction recognition pin D-Pin1 of the timing controller TCON through the first and second power lines PL1 and PL2 and the first conductive coupler SRW. Also, when the placement direction of the control PCB is the forward direction (0 degrees) which is the same as the specific direction, the second upper position may overlap the second lower position and the second power connection hole DH2 may be coupled to the second coupling socket DSK2 by the second conductive coupler SRW, and thus, the high logic power source (3.3V) may be connected to the second direction recognition pin D-Pin2 of the timing controller TCON through the third and fourth power lines PL3 and PL4 and the second conductive coupler SRW. As a result, as in FIG. 21, the timing controller TCON may transfer 0-degree placement direction information having a logic value '11' to a set board.

Figure 18:
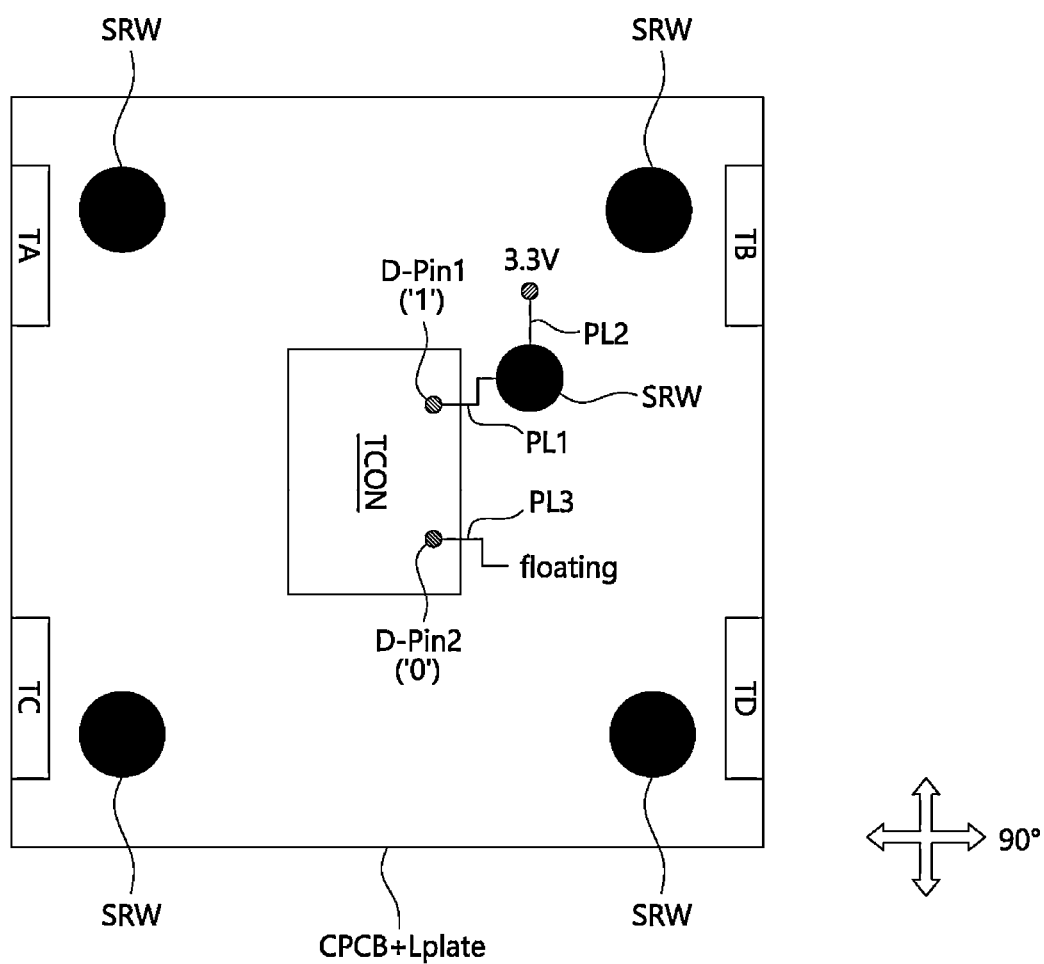

As shown in FIG. 18, when the placement direction of the control PCB is rotated by 90 degrees from the specific direction, the first upper position may overlap the second lower position and the first power connection hole DH1 may be coupled to the second coupling socket DSK2 by the first conductive coupler SRW, and thus, the high logic power source (3.3V) may be connected to the first direction recognition pin D-Pin1 of the timing controller TCON through the first and second power lines PL1 and PL2 and the first conductive coupler SRW. Also, when the placement direction of the control PCB is rotated by 90 degrees from the specific direction, the second upper position may not overlap the first and second lower positions and the second power connection hole DH2 may not be coupled to the first and second coupling sockets DSK1 and DSK2, and thus, the high logic power source (3.3V) may not be connected to the second direction recognition pin D-Pin2 of the timing controller TCON. As a result, as in FIG. 21, the timing controller TCON may transfer 90-degree placement direction information having a logic value '10' to the set board.

Figure 19:
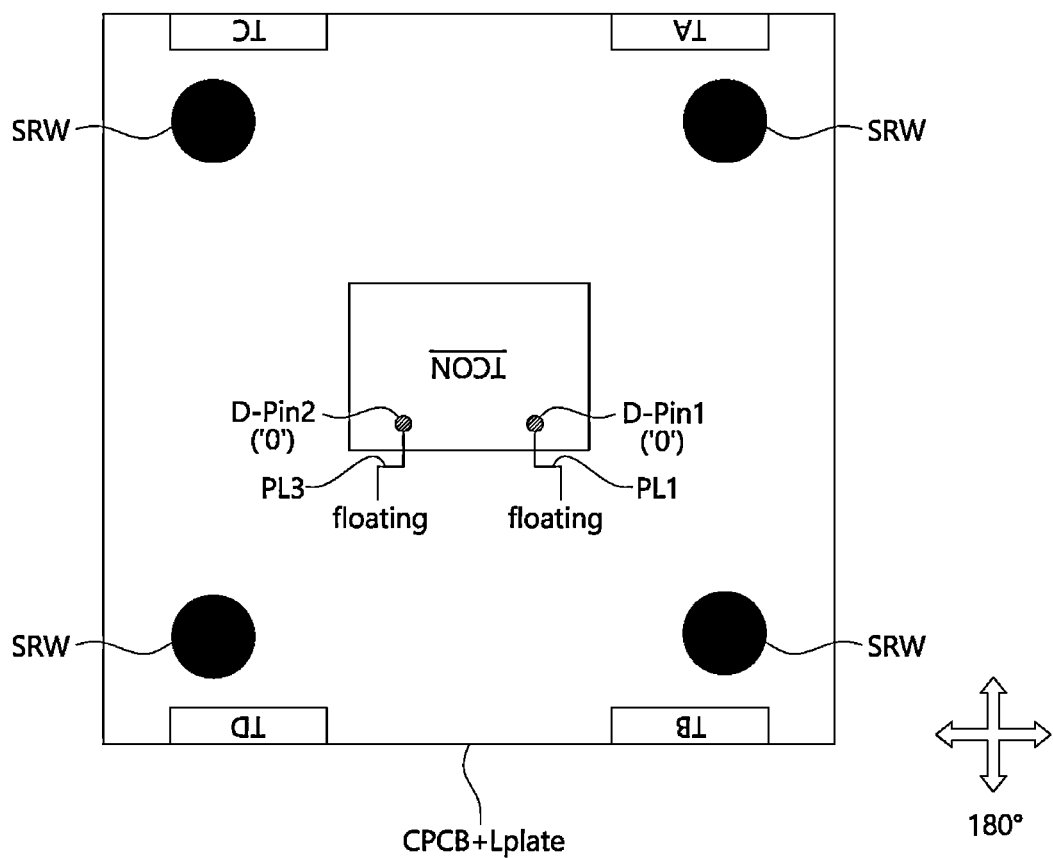

As shown in FIG. 19, when the placement direction of the control PCB is rotated by 180 degrees from the specific direction, the first upper position may not overlap the first and second lower positions and the first power connection hole DH1 may not be coupled to the first and second coupling sockets DSK1 and DSK2, and thus, the high logic power source (3.3V) may not be connected to the first direction recognition pin D-Pin1 of the timing controller TCON. Also, when the placement direction of the control PCB is rotated by 180 degrees from the specific direction, the second upper position may not overlap the first and second lower positions and the second power connection hole DH2 may not be coupled to the first and second coupling sockets DSK1 and DSK2, and thus, the high logic power source (3.3V) may not be connected to the second direction recognition pin D-Pin2 of the timing controller TCON. As a result, as in FIG. 21, the timing controller TCON may transfer 180-degree placement direction information having a logic value '00' to the set board.

Figure 20:
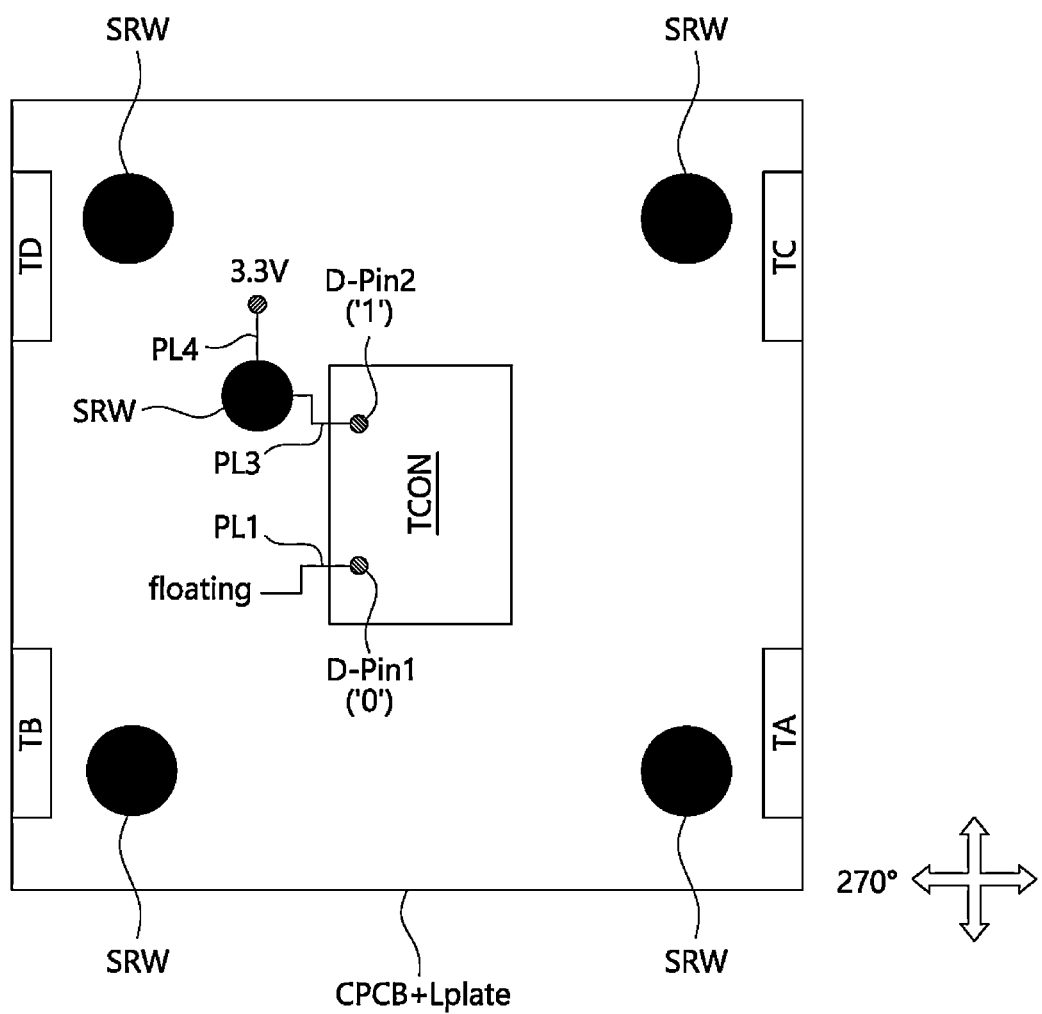
Figures 21, 22:
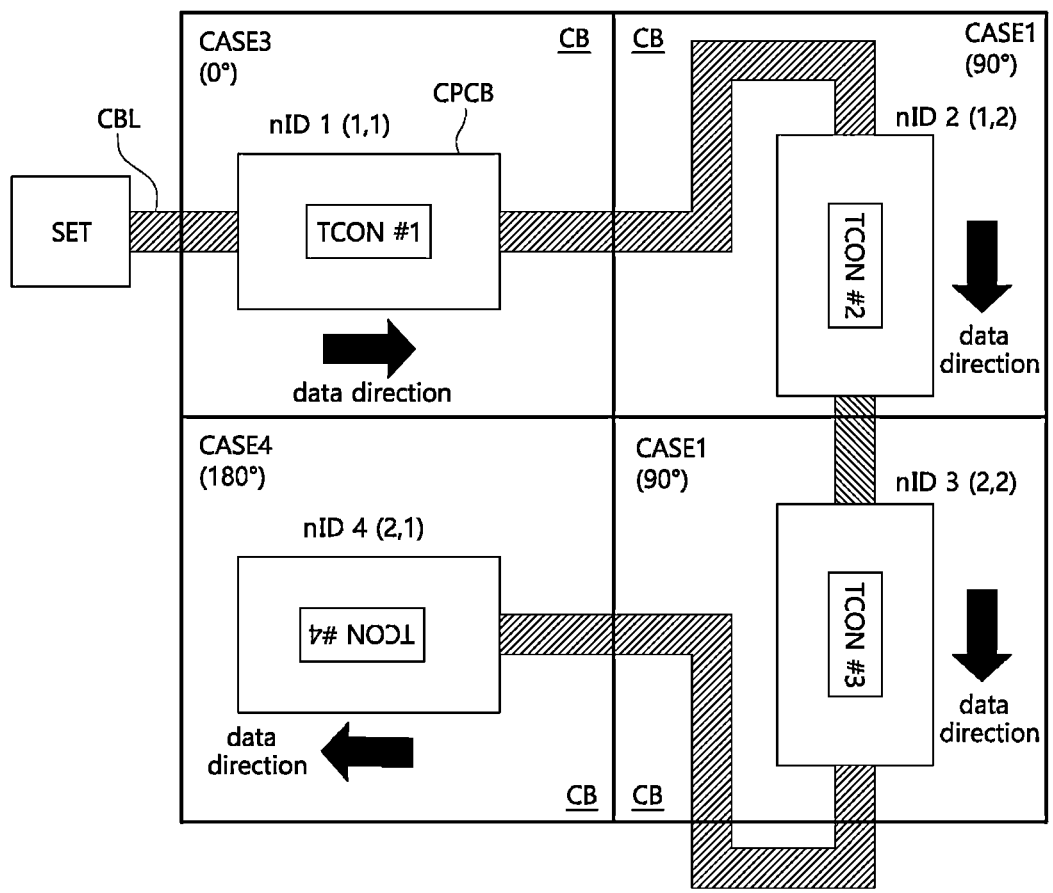

As shown in FIG. 20, when the placement direction of the control PCB is rotated by 270 degrees from the specific direction, the first upper position may not overlap the first and second lower positions and the first power connection hole DH1 may not be coupled to the first and second coupling sockets DSK1 and DSK2, and thus, the high logic power source (3.3V) may not be connected to the first direction recognition pin D-Pin1 of the timing controller TCON. Also, when the placement direction of the control PCB is rotated by 270 degrees from the specific direction, the second upper position may overlap the first lower position and the second power connection hole DH2 may be coupled to the first coupling socket DSK1 by the second conductive coupler SRW, and thus, the high logic power source (3.3V) may be connected to the second direction recognition pin D-Pin2 of the timing controller TCON through the third and fourth power lines PL3 and PL4 and the second conductive coupler SRW. As a result, as in FIG. 21, the timing controller TCON may transfer 270-degree placement direction information having a logic value '01' to a set board.

FIGS. 22 and 23 are diagrams illustrating an example where module image coordinate values of display modules are set based on a placement direction of a control PCB, in a non-formal connection structure between display modules according to one embodiment.

Referring to FIGS. 22 and 23, in order to correspond to various non-formal connection structures, cases 1 to 4 may respectively correspond to that a placement direction of a control PCB CPCB is rotated by 90 degrees, 270 degrees, 0 degrees, and 180 degrees from a specific direction. The cases 1 to 4 may be combined so that a length of an interface cable CBL is optimal.

In the non-formal connection structure, an input/output direction of image data based on the control PCB CPCB may be based on a placement direction of the control PCB CPCB.

For example, in the case 1, an input/output direction of image data may be a direction from an upper side of the control PCB CPCB to a lower side of the control PCB CPCB, and in the case 2, an input/output direction of image data may be a direction from the lower side of the control PCB CPCB to the upper side of the control PCB CPCB. Also, in the case 3, an input/output direction of image data may be a direction from a left side of the control PCB CPCB to a right side of the control PCB CPCB, and in the case 4, an input/output direction of image data may be a direction from the right side of the control PCB CPCB to the left side of the control PCB CPCB.

A set board SET may determine a module image coordinate value of each display module, on the basis of pieces of placement direction information about control PCBs CPCB received from the display modules.

The set board SET may combine pieces of placement direction information about previous and current control PCBs CPCB and module image coordinate values of the previous control PCBs CPCB to calculate module image coordinate values of the current control PCBs CPCB.

For example, in a case where a module image coordinate value of a second display module CB with TCON #2 mounted thereon is calculated, the set board SET may apply "column coordinates+1" to a module image coordinate value (1,1) of a first display module CB to calculate a module image coordinate value (1,2). This may correspond to a case where the case 3 is changed to the case 1.

In a case where a module image coordinate value of a third display module CB with TCON #3 mounted thereon is calculated, the set board SET may apply "row coordinates +1" to a module image coordinate value (1,2) of the second display module CB to calculate a module image coordinate value (2,2). This may correspond to a case where the case 1 is changed to the case 1.

In a case where a module image coordinate value of a fourth display module CB with TCON #4 mounted thereon is calculated, the set board SET may apply "column coordinates −1" to a module image coordinate value (2,2) of the third display module CB to calculate a module image coordinate value (2,1). This may correspond to a case where the case 1 is changed to the case 4.

Figure 24:
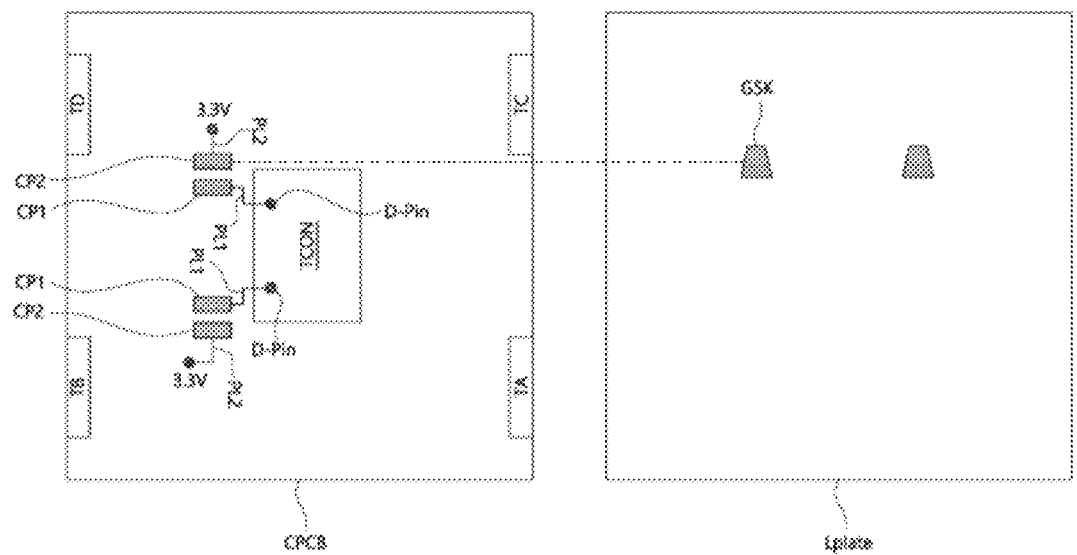
FIGS. 24 and 25 are diagrams illustrating a third embodiment of an overall connection structure of each display module for automatically recognizing a placement direction of a control PCB according to one embodiment.
Figure 25:
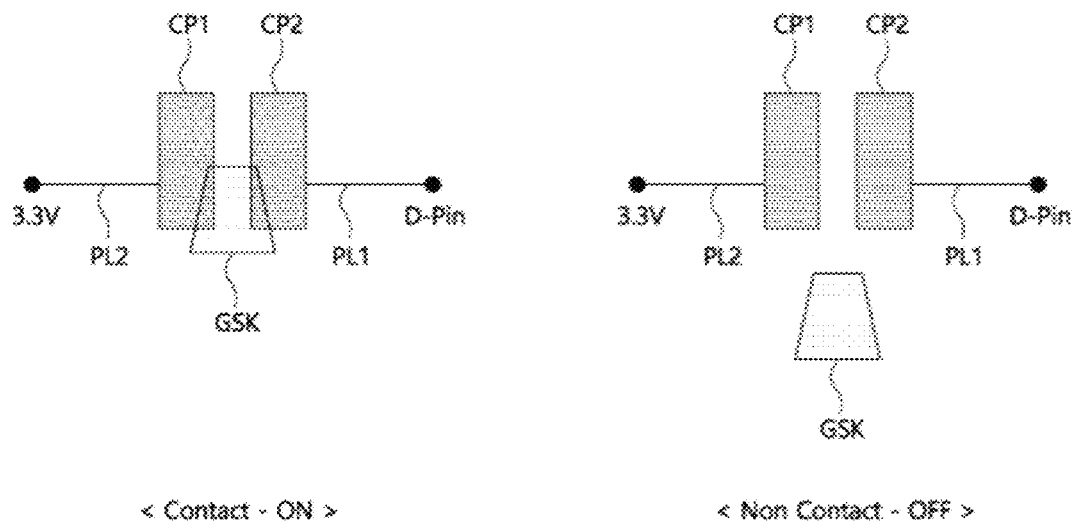

FIGS. 24 and 25 are diagrams illustrating a third embodiment of an overall connection structure of each display module for automatically recognizing a placement direction of a control PCB according to one embodiment.

Referring to FIGS. 24 and 25, each display module may further include a lower plate Lplate coupled to a rear surface of a control PCB CPCB.

A timing controller TCON may be mounted on the control PCB CPCB. The timing controller TCON may be fixed to the control PCB CPCB, and thus, a placement direction of the timing controller TCON may be changed based on a placement direction of the control PCB CPCB. In order to represent two or more placement directions of the control PCB CPCB, one or more direction recognition pins D-Pin may be included in the timing controller TCON. The direction recognition pin D-Pin may represent two or more pieces of direction information (for example, 0-dgree and 180-degree placement direction information or 0-degree, 90-degree, 180-degree, and 270-degree placement direction information) having different logic values on the basis of the placement direction of the control PCB CPCB.

A plurality of sub-holes for coupling to the lower plate Lplate and conductive pattern pairs CP1 and CP2 for connection to a high logic power source may be formed in the control PCB CPCB. The conductive pattern pairs CP1 and CP2 may be formed at a first upper position near a region with the timing controller TCON mounted therein. The conductive pattern pairs CP1 and CP2 may be further formed at another first upper position near a region with the timing controller TCON mounted therein.

The conductive pattern pairs CP1 and CP2 may include a first conductive pattern CP1 and a second conductive pattern CP2 which are electrically disconnected from each other. The first conductive pattern CP1 may be connected to the direction recognition pin D-Pin of the timing controller TCON through a first power line PL1, and the second conductive pattern CP2 may be connected to a high logic power source (3.3V) through a second power line PL2.

The lower plate Lplate may be coupled to the control PCB CPCB with being fixed to a specific direction (for example, 0 degrees), regardless of changing a placement direction of the control PCB CPCB. A first conductive gasket GSK may be provided at a first lower position of the lower plate Lplate. The first conductive gasket GSK may be further provided at another first lower position of the lower plate Lplate. A plurality of sub-sockets corresponding to the sub-holes of the control PCB CPCB may be provided in the lower plate Lplate. The sub-holes may be coupled to the sub-sockets by using a conductive coupler, but the present disclosure is not limited thereto.

The number of sub-holes and the number of sub-sockets may be implemented to be equal so that mechanical coupling between the control PCB CPCB and the lower plate Lplate is possible regardless of a placement direction of the control PCB CPCB. Particularly, it may be designed that an interval between adjacent sub-holes is equal to an interval between adjacent sub-sockets.

Based on a placement direction of the control PCB CPCB, at least one of first upper positions of the control PCB CPCB may overlap at least one of first lower positions of the lower plate Lplate, or may not overlap.

When at least one of the first upper positions overlaps at least one of the first lower positions (for example, as shown in left portion in FIG. 25) (for example, when the placement direction of the control PCB CPCB is the same as the specific direction), the first and second conductive patterns CP1 and CP2 may be electrically connected to each other through the first conductive gasket GSK at a corresponding overlap position, and thus, the high logic power source (3.3V) may be connected to the direction recognition pin D-Pin of the timing controller TCON through the first and second power lines PL1 and PL2 and the first and second conductive patterns CP1 and CP2.

On the other hand, when the first upper position does not overlap the first lower position (for example, as shown in right portion in FIG. 25) (for example, when the placement direction of the control PCB CPCB is opposite to the specific direction), the first and second conductive patterns CP1 and CP2 may be maintained with being disconnected from each other, and thus, the high logic power source (3.3V) may not be connected to the direction recognition pin D-Pin of the timing controller TCON.

In FIGS. 24 and 25, in a case where each control PCB CPCB is connected to the lower plate Lplate being rotated by 0 degrees and 180 degrees from the specific direction, an operation of generating placement direction information in the timing controller TCON may be similar to details described above with reference to FIGS. 13 and 14.

In FIGS. 24 and 25, in a case where each control PCB CPCB is connected to the lower plate Lplate being rotated by 0 degrees, 90 degrees, 180 degrees, and 270 degrees from the specific direction, an operation of generating placement direction information in the timing controller TCON may be similar to details described above with reference to FIGS. 17 to 20.

Figure 26:
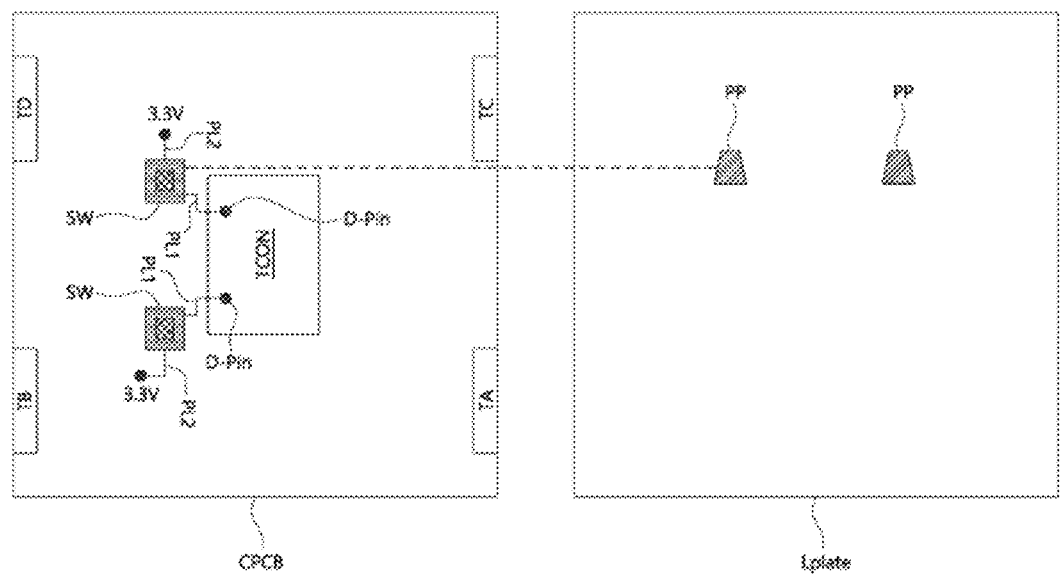
FIGS. 26 and 27 are diagrams illustrating a fourth embodiment of an overall connection structure of each display module for automatically recognizing a placement direction of a control PCB according to one embodiment.
Figure 27:
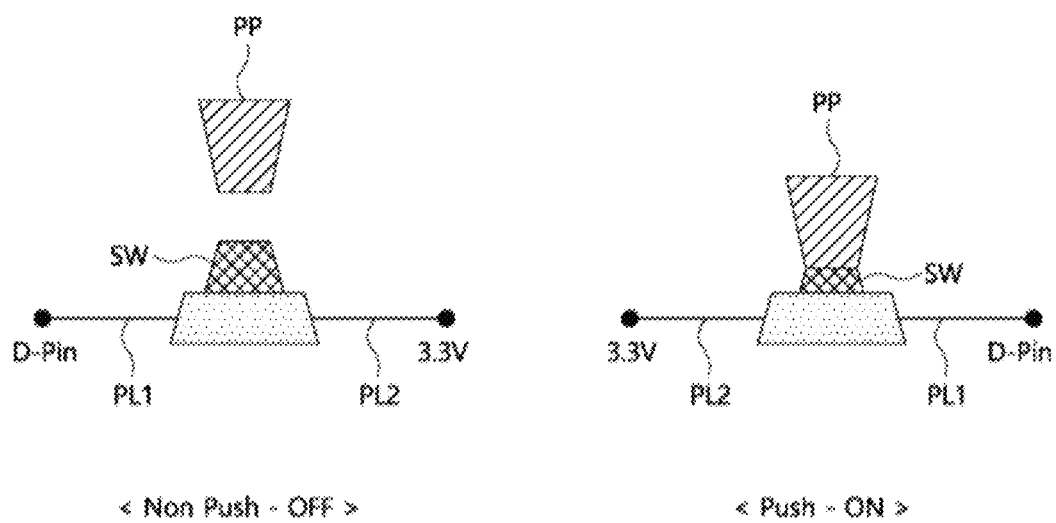

FIGS. 26 and 27 are diagrams illustrating an overall connection structure of each display module for automatically recognizing a placement direction of a control PCB according to a fourth embodiment.

Referring to FIGS. 26 and 27, each display module may further include a lower plate Lplate coupled to a rear surface of a control PCB CPCB.

A timing controller TCON may be mounted on the control PCB CPCB. The timing controller TCON may be fixed to the control PCB CPCB, and thus, a placement direction of the timing controller TCON may be changed based on a placement direction of the control PCB CPCB. In order to represent two or more placement directions of the control PCB CPCB, one or more direction recognition pins D-Pin may be included in the timing controller TCON. The direction recognition pin D-Pin may represent two or more pieces of direction information (for example, 0-dgree and 180-degree placement direction information or 0-degree, 90-degree, 180-degree, and 270-degree placement direction information) having different logic values on the basis of the placement direction of the control PCB CPCB.

A plurality of sub-holes for coupling to the lower plate Lplate and a push switch SW for connection to a high logic power source may be formed in the control PCB CPCB. The push switch SW may be formed at a first upper position near a region with the timing controller TCON mounted therein. The push switch SW may be further formed at another first upper position near a region with the timing controller TCON mounted therein.

The push switch SW may be connected to the direction recognition pin D-Pin of the timing controller TCON through a first power line PL1 and may be connected to a high logic power source (3.3V) through a second power line PL2.

The lower plate Lplate may be coupled to the control PCB CPCB with being fixed to a specific direction (for example, 0 degrees), regardless of changing a placement direction of the control PCB CPCB. A first protrusion portion PP may be provided at a first lower position of the lower plate Lplate. The first protrusion portion PP may be further provided at another first lower position of the lower plate Lplate. A plurality of sub-sockets corresponding to sub-holes of the control PCB CPCB may be provided in the lower plate Lplate. The sub-holes may be coupled to the sub-sockets by using a conductive coupler SRW, but the present disclosure is not limited thereto.

The number of sub-holes and the number of sub-sockets may be implemented to be equal so that mechanical coupling between the control PCB CPCB and the lower plate Lplate is possible regardless of a placement direction of the control PCB CPCB. Particularly, it may be designed that an interval between adjacent sub-holes is equal to an interval between adjacent sub-sockets.

Based on a placement direction of the control PCB CPCB, at least one of first upper positions of the control PCB CPCB may overlap at least one of first lower positions of the lower plate Lplate, or may not overlap.

When at least one of the first upper positions overlaps at least one of the first lower positions (for example, as shown in right portion in FIG. 27) (for example, when the placement direction of the control PCB CPCB is the same as the specific direction), the push switch SW may be turned on based on contacting the first protrusion portion PP at a corresponding overlap position, and thus, the high logic power source (3.3V) may be connected to the direction recognition pin D-Pin of the timing controller TCON through the first and second power lines PL1 and PL2 and the push switch SW.

On the other hand, when the first upper position does not overlap the first lower position (for example, as shown in left portion in FIG. 27) (for example, when the placement direction of the control PCB CPCB is opposite to the specific direction), the push switch SW may be maintained with being turned off, and thus, the high logic power source (3.3V) may not be connected to the direction recognition pin D-Pin of the timing controller TCON.

In FIGS. 26 and 27, in a case where each control PCB CPCB is connected to the lower plate Lplate with being rotated by 0 degrees and 180 degrees from the specific direction, an operation of generating placement direction information in the timing controller TCON may be similar to details described above with reference to FIGS. 13 and 14.

In FIGS. 26 and 27, in a case where each control PCB CPCB is connected to the lower plate Lplate with being rotated by 0 degrees, 90 degrees, 180 degrees, and 270 degrees from the specific direction, an operation of generating placement direction information in the timing controller TCON may be similar to details described above with reference to FIGS. 17 to 20.

FIGS. 28 to 31 are diagrams illustrating an example of input/output image matching based on a placement direction of a control PCB according to one embodiment. In FIGS. 28 to 31, "EPI-1, EPI-2, and EPI-3" may each be an internal interface line for data communication between a timing controller TCON and panel driving circuits.

Referring to FIGS. 28 to 31, the timing controller TCON may perform a sub-image re-matching operation so that a module image distribution order is the same as a default distribution order or differs from the default distribution order, on the basis of image re-matching control information from a set board.

According to a default distribution order TA[1], TB[2], TC[3], TD[4], a sub-image 1 may be output to a first display panel PNL-A through a first output port TA, a sub-image 2 may be output to a second display panel PNL-B through a second output port TB, a sub-image 3 may be output to a third display panel PNL-C through a third output port TC, and a sub-image 4 may be output to a fourth display panel PNL-D through a fourth output port TD.

Figure 28:
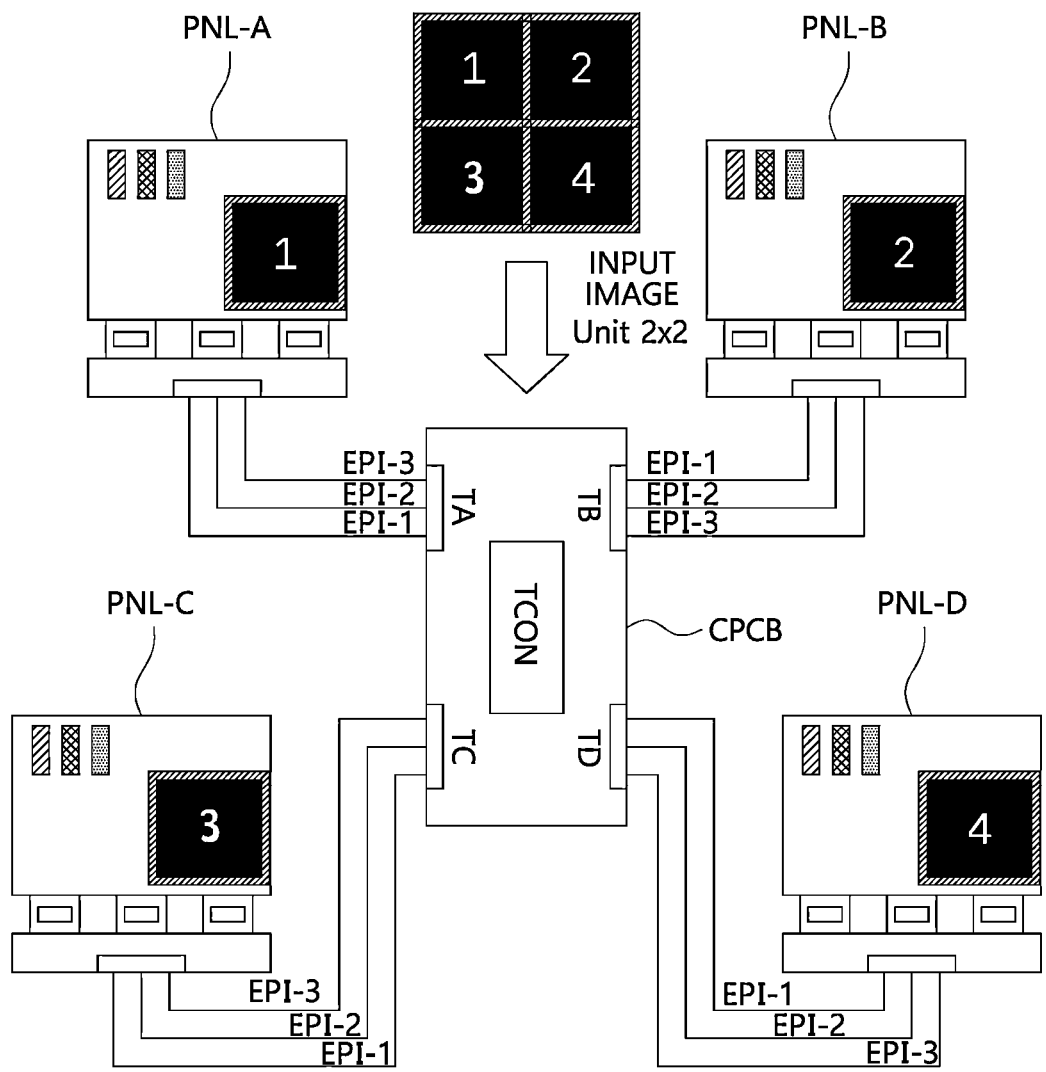
FIGS. 28 to 31 are diagrams illustrating an example of input/output image matching based on a placement direction of a control PCB according to one embodiment.

As shown in FIG. 28, in a case 1 where a placement direction of a control PCB CPCB is the same as a default direction (for example, a direction rotated by 90 degrees from the forward direction), a panel output image based on the default distribution order may identically match an input module image MI. That is, the module image MI may be intactly displayed by four display panels without image inversion or image mixing, and thus, a sub-image re-matching operation may not be performed. The timing controller TCON may distribute image data of sub-images to first to fourth output ports TA, TB, TC, and TD on the basis of the default distribution order.

Figure 29:
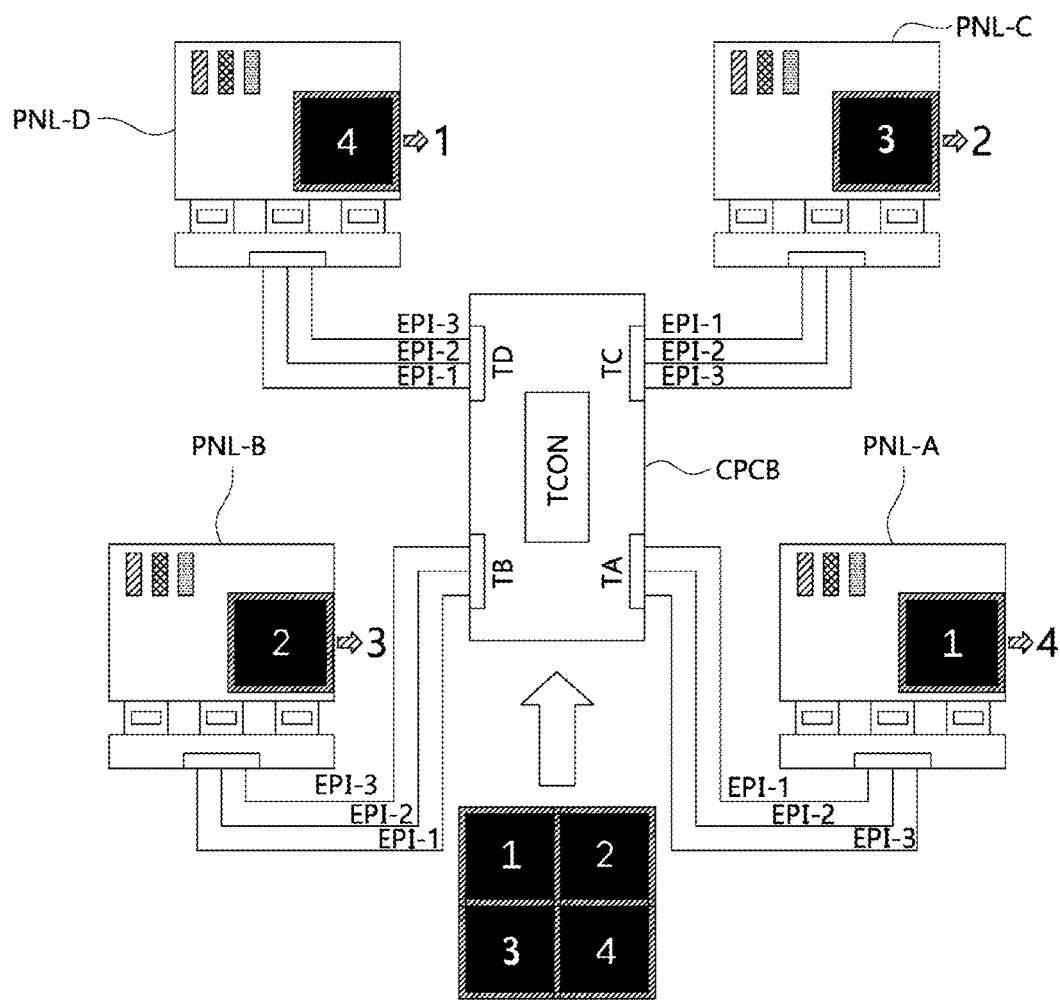
Figure 30:
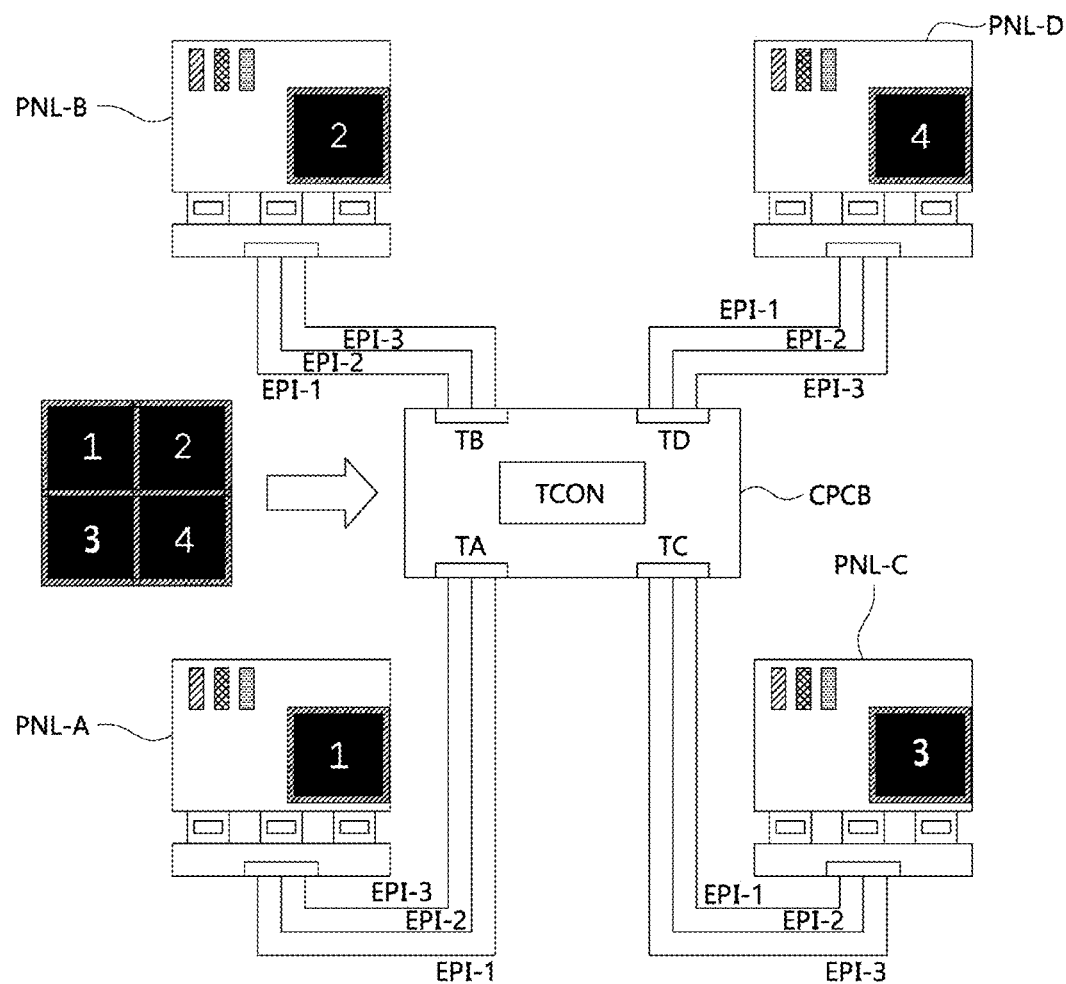
Figure 31:
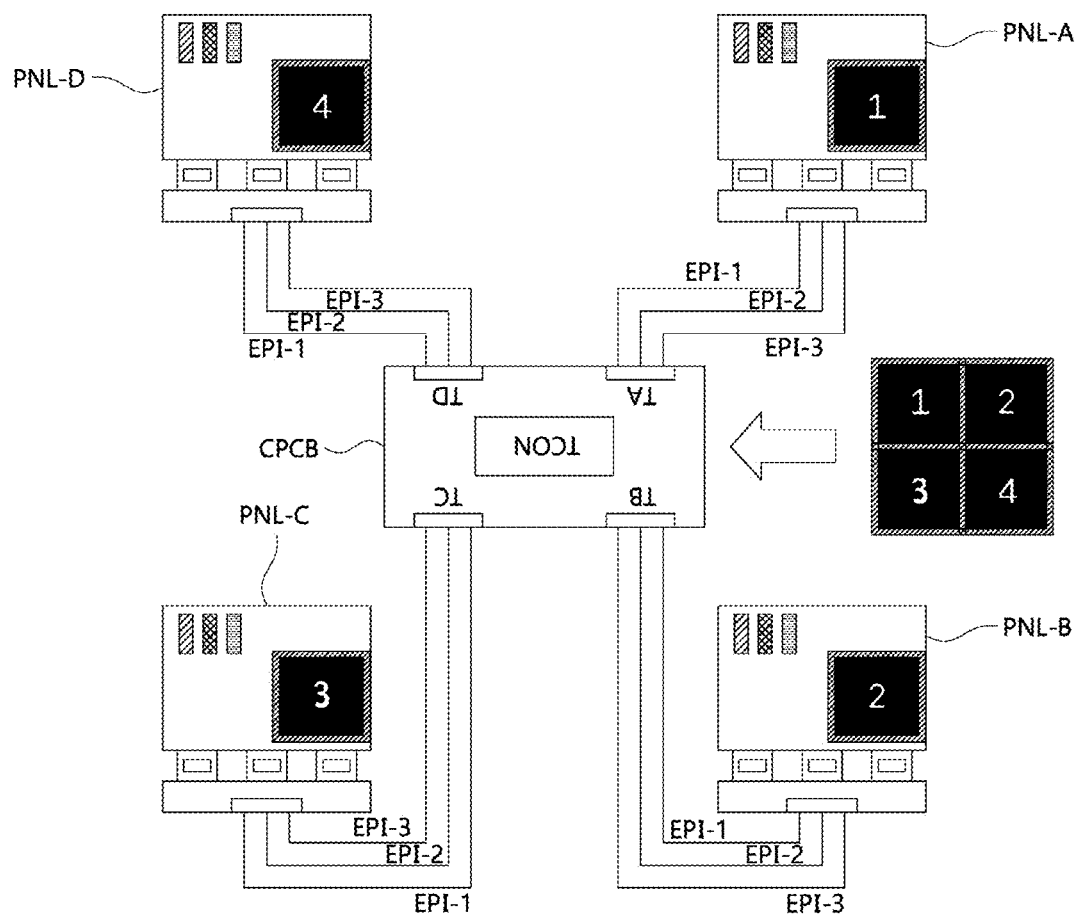

As shown in FIGS. 29 to 31, in cases 2, 3, and 4 where a placement direction of a control PCB CPCB differs from the default direction, the panel output image based on the default distribution order may not match the input module image MI. In order to remove image mismatching, a sub-image re-matching operation may be performed in the cases 2, 3, and 4.

In detail, as in the case 2 of FIG. 29, in a display module where the control PCB CPCB is arranged in a direction rotated by 270 degrees from the forward direction, image data of sub-images may be distributed to the first to fourth output ports TA, TB, TC, and TD unlike the default distribution order. In other words, a sub-image 1 may be redistributed to the fourth output port TD, a sub-image 2 may be redistributed to the third output port TC, a sub-image 3 may be redistributed to the second output port TB, and a sub-image 4 may be redistributed to the first output port TA (that is to say, the distribution order is TD[1], TC[2], TB[3], TA[4]).

Moreover, as in the case 3 of FIG. 30, in a display module where the control PCB CPCB is arranged in the forward direction, image data of sub-images may be distributed to the first to fourth output ports TA, TB, TC, and TD unlike the default distribution order. In other words, the sub-image 1 may be redistributed to the second output port TB, the sub-image 2 may be redistributed to the fourth output port TD, the sub-image 3 may be redistributed to the first output port TA, and the sub-image 4 may be redistributed to the third output port TC (that is to say, the distribution order is TB[1], TD[2], TA[3], TC[4]).

Moreover, as in the case 4 of FIG. 31, in a display module where the control PCB CPCB is arranged in a direction rotated by 180 degrees from the forward direction, image data of sub-images may be distributed to the first to fourth output ports TA, TB, TC, and TD unlike the default distribution order. In other words, the sub-image 1 may be redistributed to the fourth output port TD, the sub-image 2 may be redistributed to the first output port TA, and the sub-image 4 may be redistributed to the second output port TB. However, the sub-image 3 may be redistributed to the third output port TC (that is to say, the distribution order is TD[1], TA[2], TC[3], TB[4]).

Figure 32:
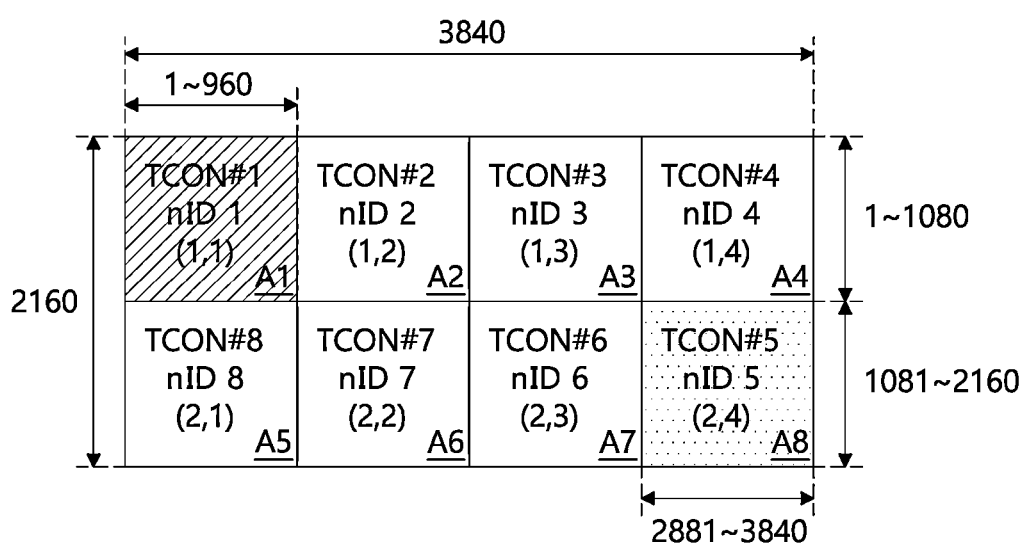
FIG. 32 is a diagram illustrating 4K-resolution input image data allocated to display modules having a non-formal connection structure of FIG. 10A according to one embodiment.
Figure 33:
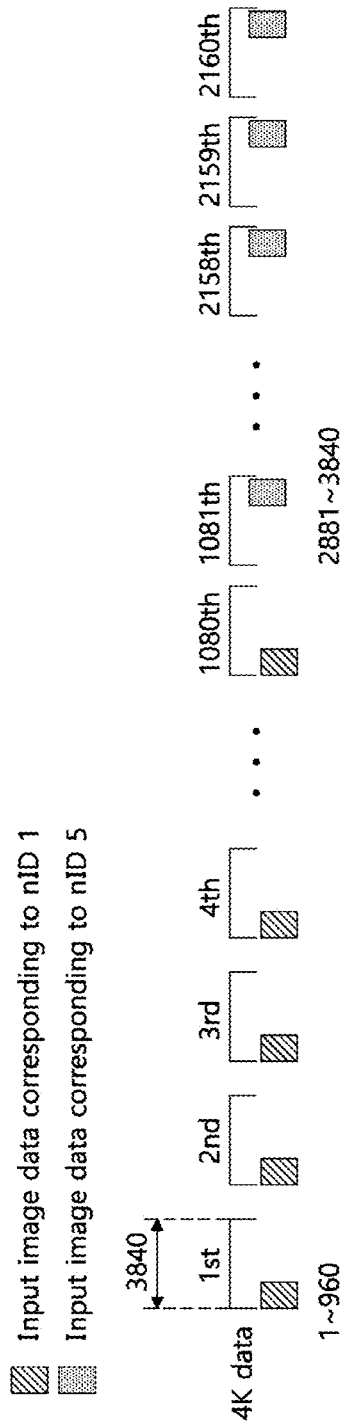
FIG. 33 is a diagram illustrating module image data, allocated to first and fifth display modules, of the input image data of FIG. 32 according to one embodiment.

FIG. 32 is a diagram illustrating 4K-resolution input image data allocated to display modules having a non-formal connection structure of FIG. 10A according to one embodiment. FIG. 33 is a diagram illustrating module image data, allocated to first and fifth display modules, of the input image data of FIG. 32 according to one embodiment.

Referring to FIGS. 10A, 32, and 33, a set board SET may set image re-matching control information and module image coordinate values (1,1) to (2,4) corresponding to a module image, on the basis of module identification numbers nID 1 to nID 8 assigned to timing controllers TCON #1 to TCON #8 and a placement direction in which control PCBs are arranged.

The 4K resolution may be 3840*2160. The timing controllers TCON #1 to TCON #8 may divisionally process eight module images A1 to A8 configuring the 4K resolution. For example, a first timing controller TCON #1 may process a first module image A1 corresponding to a module image coordinate value (1,1), and a fifth timing controller TCON #5 may process a fifth module image A5 corresponding to a module image coordinate value (2,4).

The first module image A1 may have a unit horizontal resolution X "1 to 960" and a unit vertical resolution Y "1 to 1080". The fifth module image A5 may have a unit horizontal resolution X "2881 to 3840" and a unit vertical resolution Y "1081 to 2160".

Figure 34:
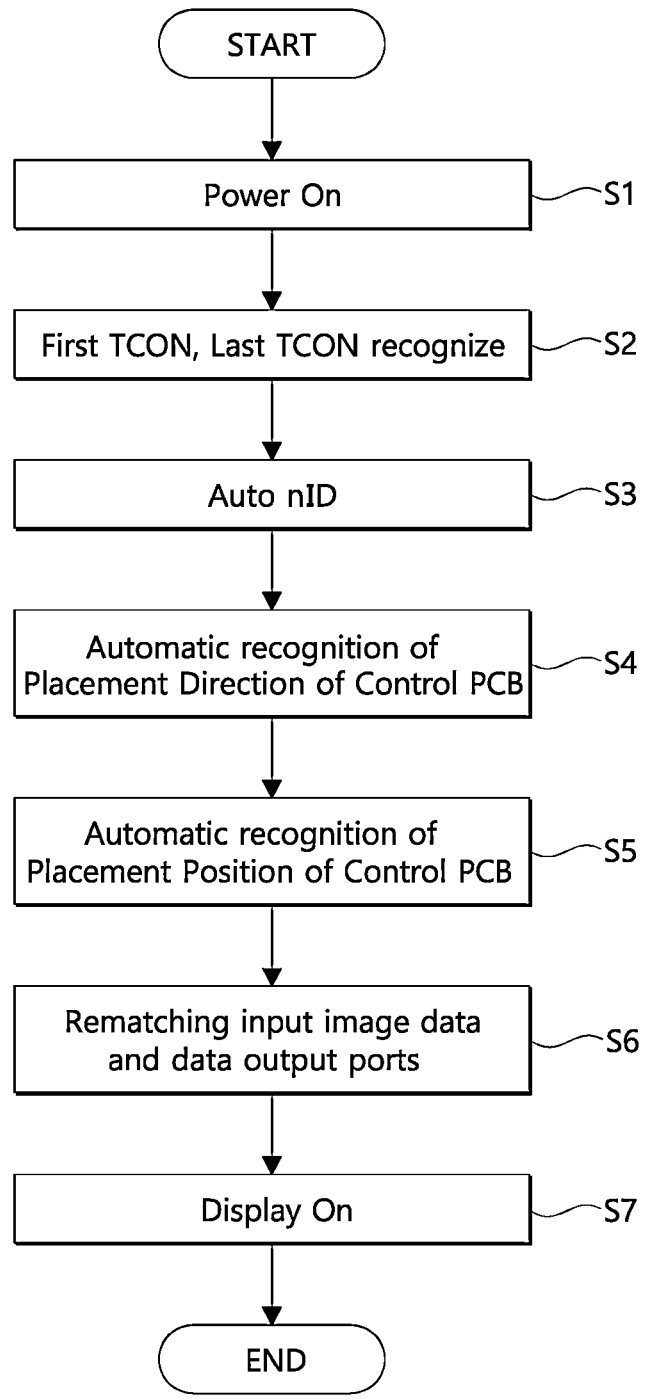
FIG. 34 is a diagram illustrating an automatic control sequence of a tiling display apparatus according to an embodiment of the present disclosure.

FIG. 34 is a diagram illustrating an automatic control sequence of a tiling display apparatus according to an embodiment of the present disclosure.

Referring to FIG. 34, an automatic control sequence of the tiling display apparatus according to an embodiment of the present disclosure may include auto nID setting processes S2 and S3 and auto image coordinate recognition processes S4, S5, and S6, which are performed in a power-on sequence period.

In S1, the power-on is performed.

In S2, the first TCON and the last TCON are recognized.

In S3, the auto nID setting is performed.

The detailed explanation on auto nID setting processes S2 and S3 may be as described above with reference to FIGS. 7 to 9.

In S4, automatic recognition of placement direction of the control PCB is performed. In S5, automatic recognition of placement position of the control PCB is performed. In S6, the input image data and data output ports are rematched.

The detailed explanation on auto image coordinate recognition processes S4, S5, and S6 may be as described above with reference to FIGS. 12A to 31.

In S7, the display on is performed.

The present embodiment may realize the following effects.

According to the present embodiment, when a control PCB is bonded to a lower plate, a placement direction and position of the control PCB may be automatically checked in a set board. Accordingly, it is not needed for a user to input information, associated with the placement direction and position of the control PCB, to a memory whenever a display module is installed or replaced.

Therefore, in the present embodiment, resources of a display apparatus associated with settings of a module image coordinate value and a module identification number may decrease, the convenience of a user may increase, and an error caused by a mistake of the user may be prevented.

The effects according to the present disclosure are not limited to the above examples, and other various effects may be included in the specification.

While the present disclosure has been particularly shown and described with reference to embodiments thereof, it will be understood by those of ordinary skill in the art that various changes in form and details may be made therein without departing from the spirit and scope of the present disclosure as defined by the following claims.

What is claimed is:

1. A tiling display apparatus comprising:
a plurality of display modules connected to one another through an interface circuit based on a serial communication scheme to divide input image data configuring one screen to display a plurality of module images; and
a set board configured to check a module identification number based on a connection order of the plurality of display modules, and set image re-matching control information and a module image coordinate value corresponding to a module image from the plurality of module images for each of the plurality of display modules based on a placement direction of a control printed circuit board (PCB) that is individually included in each display module from the plurality of display modules.

2. The tiling display apparatus of claim 1, wherein each of the plurality of display modules comprises:
a timing controller configured to divide the module image into a plurality of sub-images; and
a plurality of display panels displaying the plurality of sub-images, and
the control PCB including a plurality of image output ports that electrically connect the timing controller to the plurality of display panels, the timing controller mounted on the control PCB, and
the timing controller configured to re-match image data of the plurality of sub-images with the plurality of image output ports based on the module image coordinate value and the image re-matching control information transferred from the set board.

3. The tiling display apparatus of claim 2, wherein, responsive to a placement direction of the control PCB being the same as a default direction, the timing controller is configured to distribute the image data of the plurality of sub-images to the plurality of image output ports based on a default distribution order, and
responsive to the placement direction of the control PCB differing from the default direction, the timing controller is configured to distribute the image data of the plurality of sub-images to the plurality of image output ports unlike the default distribution order.

4. The tiling display apparatus of claim 2, wherein each of the plurality of display modules further comprises:
a lower plate coupled to a rear surface of the control PCB in a specific direction fixed regardless of the placement direction of the control PCB;
a first coupling socket at a first lower position of the lower plate;
a first power connection hole at a first upper position at a region with the timing controller mounted therein in the control PCB;
a first power line connected between a first direction recognition pin of the timing controller and the first power connection hole; and
a second power line connected between a high logic power source and the first power connection hole.

5. The tiling display apparatus of claim 4, wherein, responsive to the placement direction of the control PCB being the same as the specific direction, the first upper position overlaps the first lower position, and the first power connection hole is coupled to the first coupling socket by a first conductive coupler, whereby the high logic power source is connected to the first direction recognition pin of the timing controller through the first power line, the second power line, and the first conductive coupler.

6. The tiling display apparatus of claim 4, wherein responsive to the placement direction of the control PCB being opposite to the specific direction, the first upper position is nonoverlapping with the first lower position, and the first power connection hole is not coupled to the first coupling socket such that the high logic power source is not connected to the first direction recognition pin of the timing controller.

7. The tiling display apparatus of claim 2, wherein each of the plurality of display modules further comprises:
a lower plate coupled to a rear surface of the control PCB in a specific direction fixed regardless of the placement direction of the control PCB;
a first coupling socket and a second coupling socket respectively at a first lower position and a second lower position of the lower plate;
a first power connection hole and a second power connection hole respectively at a first upper position and a second upper position at a region with the timing controller mounted therein in the control PCB;
a first power line connected between a first direction recognition pin of the timing controller and the first power connection hole;
a second power line connected between a high logic power source and the first power connection hole;
a third power line connected between a second direction recognition pin of the timing controller and the second power connection hole; and
a fourth power line connected between the high logic power source and the second power connection hole.

8. The tiling display apparatus of claim 7, wherein, responsive to the placement direction of the control PCB being the same as the specific direction,
the first upper position overlaps the first lower position, and the first power connection hole is coupled to the first coupling socket by a first conductive coupler such that the high logic power source is connected to the first direction recognition pin of the timing controller through the first power line, the second power line, and the first conductive coupler, and
the second upper position overlaps the second lower position, and the second power connection hole is coupled to the second coupling socket by a second conductive coupler such that the high logic power source is connected to the second direction recognition pin of the timing controller through the third power line, the fourth power line, and the second conductive coupler.

9. The tiling display apparatus of claim 7, wherein, when the placement direction of the control PCB is rotated by 90 degrees from the specific direction,
the first upper position overlaps the second lower position, and the first power connection hole is coupled to the second coupling socket by a first conductive coupler such that the high logic power source is connected to the first direction recognition pin of the timing controller through the first power line, the second power line, and the first conductive coupler, and
the second upper position is non-overlapping with the first lower position and the second lower position, and the second power connection hole is not coupled to the first coupling socket and the second coupling socket such that the high logic power source is not connected to the second direction recognition pin of the timing controller.

10. The tiling display apparatus of claim 7, wherein, responsive to the placement direction of the control PCB being rotated by 180 degrees from the specific direction,
the first upper position is non-overlapping with the first lower position and the second lower position, and the first power connection hole is not coupled to the first coupling socket and the second coupling socket such that the high logic power source is not connected to the first direction recognition pin of the timing controller, and
the second upper position is non-overlapping with the first lower position and the second lower position, and the second power connection hole is not coupled to the first coupling socket and the second coupling socket such that the high logic power source is not connected to the second direction recognition pin of the timing controller.

11. The tiling display apparatus of claim 7, wherein, responsive to the placement direction of the control PCB is rotated by 270 degrees from the specific direction,
the first upper position is non-overlapping with the first lower position and the second lower position, and the first power connection hole is not coupled to the first coupling socket and the second coupling socket such that the high logic power source is not connected to the first direction recognition pin of the timing controller, and
the second upper position overlaps the first lower position, and the second power connection hole is coupled to the first coupling socket by a second conductive coupler such that the high logic power source is connected to the second direction recognition pin of the timing controller through the third power line, the fourth power line, and the second conductive coupler.

12. The tiling display apparatus of claim 2, wherein each of the plurality of display modules further comprises:
a lower plate coupled to a rear surface of the control PCB in a specific direction fixed regardless of the placement direction of the control PCB;
a first conductive gasket provided at a first lower position of the lower plate;
a first conductive pattern and a second conductive pattern spaced apart from each other at a first upper position at a region with the timing controller mounted therein in the control PCB;
a first power line connected between a first direction recognition pin of the timing controller and the first conductive pattern; and
a second power line connected between a high logic power source and the second conductive pattern.

13. The tiling display apparatus of claim 12, wherein, responsive to the placement direction of the control PCB being the same as the specific direction,
the first upper position overlaps the first lower position, and the first conductive pattern is electrically connected to the second conductive pattern through the first conductive gasket such that the high logic power source is connected to the direction recognition pin of the timing controller through the first power line, the second power line, the first conductive pattern, and the second conductive pattern.

14. The tiling display apparatus of claim 12, wherein, responsive to the placement direction of the control PCB being opposite to the specific direction,
the first upper position is non-overlapping with the first lower position, and the first conductive pattern and the second conductive pattern are apart from each other such that the high logic power source is not connected to the direction recognition pin of the timing controller.

15. The tiling display apparatus of claim 2, wherein each of the plurality of display modules further comprises:
a lower plate coupled to a rear surface of the control PCB in a specific direction fixed regardless of the placement direction of the control PCB;
a first protrusion portion provided at a first lower position of the lower plate;
a push switch provided at a first upper position at a region with the timing controller mounted therein in the control PCB;
a first power line connected between a direction recognition pin of the timing controller and the push switch; and
a second power line connected between a high logic power source and the push switch.

16. The tiling display apparatus of claim 15, wherein, responsive to the placement direction of the control PCB being the same as the specific direction,
the first upper position overlaps the first lower position, and the push switch is turned on based on contacting the first protrusion portion such that the high logic power source is connected to the direction recognition pin of the timing controller through the first power line, the second power line, and the push switch.

17. The tiling display apparatus of claim 15, wherein, responsive to the placement direction of the control PCB being opposite to the specific direction,
the first upper position is non-overlapping with the first lower position, and the push switch is maintained in a turn-off state such that the high logic power source is not connected to the direction recognition pin of the timing controller.

18. The tiling display apparatus of claim 1, wherein each of the plurality of display modules comprises a timing controller;
- a first timing controller based on a connection order of the plurality of display modules, the first timing controller comprising a first option pin connected to a high logic power source and a second option pin connected to the high logic power source,
- a last timing controller based on the connection order of the plurality of display modules, the last timing controller comprising a first option pin connected to a low logic power source and a second option pin floated, and
- each of other timing controllers except the first timing controller and the last timing controller comprises a first option pin connected to the low logic power source and a second option pin connected to the high logic power source.

19. A tiling display apparatus comprising:
- a plurality of display modules connected to one another through an interface circuit based on a serial communication scheme to divide input image data configuring one screen to display a plurality of module images, wherein each of the plurality of display modules includes a control printed circuit board (PCB), and a timing controller dividing the module image into a plurality of sub-images; and
- a set board generating a control command signal for causing the timing controllers in the plurality of display modules to sequentially generate a module identification number and setting, for each display modules, image re-matching control information and a module image coordinate value corresponding to the module image on the basis of a placement direction of the control PCB.

* * * * *